US012605970B2

(12) United States Patent
Sato

(10) Patent No.: US 12,605,970 B2
(45) Date of Patent: Apr. 21, 2026

(54) TIRE

(71) Applicant: The Yokohama Rubber Co., LTD.,
Tokyo (JP)

(72) Inventor: Shun Sato, Kanagawa (JP)

(73) Assignee: The Yokohama Rubber Co., LTD.,
Tokyo (JP)

( * ) Notice: Subject to any disclaimer, the term of this
patent is extended or adjusted under 35
U.S.C. 154(b) by 169 days.

(21) Appl. No.: 17/239,805

(22) Filed: Apr. 26, 2021

(65) Prior Publication Data

US 2021/0339570 A1 Nov. 4, 2021

(30) Foreign Application Priority Data

Apr. 30, 2020 (JP) ................................. 2020-080848

(51) Int. Cl.
*B60C 11/03* (2006.01)
*B60C 11/13* (2006.01)

(52) U.S. Cl.
CPC ...... *B60C 11/0309* (2013.01); *B60C 11/1323*
(2013.01); *B60C 2011/0346* (2013.01);
(Continued)

(58) Field of Classification Search
CPC ............. B60C 11/0309; B60C 11/1315; B60C
11/1323; B60C 2011/0346;
(Continued)

(56) References Cited

U.S. PATENT DOCUMENTS 3,664,402 A * 5/1972 Montagne ........... B60C 11/0309
152/209.24
4,730,654 A * 3/1988 Yamashita ............ B60C 19/001
152/902

(Continued)

FOREIGN PATENT DOCUMENTS

CN 106573502 A * 4/2017 ......... B60C 11/0302
DE 11 2019 003 266 T5 3/2021
(Continued)

OTHER PUBLICATIONS

Li, English Machine Translation of JP 2012111342, 2012 (Year: 2012).*

(Continued)

*Primary Examiner* — Justin R Fischer
*Assistant Examiner* — Brendon Charles Darby
(74) *Attorney, Agent, or Firm* — Thorpe North & Western

(57) ABSTRACT

In a tire including a block having an edge along a main groove closer to an equatorial plane and a block having an edge along a main groove farther from the equatorial plane, the angles between an imaginary line extending a ridge line formed by a bend point of a groove wall on the edge side of the main groove and imaginary lines extending each of edges adjacent in a circumferential direction with the edge interposed therebetween are an acute angle ($\theta a$) and an obtuse angle ($\theta b$), and the angles between an imaginary line extending a ridge line formed by a bend point of a groove wall on the edge side of the main groove and imaginary lines extending each of edges adjacent in the circumferential direction with the edge interposed therebetween are an acute angle ($\theta c$) and an obtuse angle ($\theta d$), with a relationship ($\theta d - \theta c) < (\theta b - \theta a$).

21 Claims, 24 Drawing Sheets

(52) U.S. Cl.
CPC ................. *B60C 2011/0355* (2013.01); *B60C 2011/0372* (2013.01); *B60C 2200/06* (2013.01)

(58) Field of Classification Search
CPC ..... B60C 2011/0355; B60C 2011/0372; B60C 2200/06; B60C 11/0306
See application file for complete search history.

(56) References Cited

U.S. PATENT DOCUMENTS

| | | | | |
|---|---|---|---|---|
| 4,779,656 A | * | 10/1988 | Graas | B60C 11/0302 152/DIG. 3 |
| 5,088,536 A | * | 2/1992 | Graas | B60C 11/11 152/902 |
| 5,135,038 A | * | 8/1992 | Graas | B60C 11/1369 152/902 |
| 5,407,005 A | * | 4/1995 | Consolacion | B60C 11/033 152/902 |
| 2010/0096055 A1 | | 4/2010 | Shibano | |
| 2012/0000586 A1 | * | 1/2012 | Kami | B60C 11/0332 152/209.18 |
| 2012/0241061 A1 | | 9/2012 | Maehara | |
| 2017/0008349 A1 | * | 1/2017 | Tanaka | B60C 11/047 |
| 2017/0253088 A1 | * | 9/2017 | Maehara | B60C 11/0304 |
| 2019/0283505 A1 | * | 9/2019 | Kuriyama | B60C 5/00 |
| 2021/0260930 A1 | | 8/2021 | Sato | |

FOREIGN PATENT DOCUMENTS

| | | | | | |
|---|---|---|---|---|---|
| JP | S63-072024 | U | | 5/1988 | |
| JP | 2536852 | B2 | * | 9/1996 | ......... B60C 11/0309 |
| JP | 2005289124 | A | * | 10/2005 | ......... B60C 11/1384 |
| JP | 2008296795 | A | * | 12/2008 | ........... B60C 11/047 |
| JP | 2009006870 | A | * | 1/2009 | |
| JP | 2012111342 | A | * | 6/2012 | ............ B60C 11/01 |
| JP | 2012-201253 | A | | 10/2012 | |
| JP | 5250017 | B2 | | 7/2013 | |
| JP | 2020-055356 | A | | 9/2020 | |
| WO | WO 2020/045130 | A1 | | 3/2020 | |

OTHER PUBLICATIONS

Ito, English Machine Translation of JP 2005289124, 2005 (Year: 2005).*

Itakura, English Machine Translation of JP 2009006870, 2009 (Year: 2009).*

Ogawa, English Machine Translation of JP 2536852 B2, 1996 (Year: 1996).*

Behr, English Machine Translation of CN 106573502, 2017 (Year: 2017).*

Ito, English Machine Translation of JP 2008296795, 2008 (Year: 2008).*

* cited by examiner

TIRE WIDTH DIRECTION

TIRE RADIAL DIRECTION

TIRE RADIAL
DIRECTION

1

TIRE

CROSS-REFERENCE TO RELATED APPLICATIONS

This application claims priority pursuant to 35 U.S.C. 119(a) of Japan Patent Application No. 2020-080848, filed Apr. 30, 2020, which application is incorporated herein by reference in its entirety.

TECHNICAL FIELD

The present technology relates to a tire.

BACKGROUND ART

Among heavy duty tires, tires marked with a severe snow mark are required to have improved snow traction performance. Tires employed in vehicles, for example, garbage collection vehicles, that have large loads and frequently start and stop are run rigorously, and thus it is difficult to provide rolling resistance performance and snow traction performance in a compatible manner.

Japan Patent No. 5250017 discloses a technology for preventing stone biting by changing a groove wall angle of a main groove.

According to the tire disclosed in Japan Patent No. 5250017, the effect of preventing stone biting can be increased. However, there is room for enhancement in improving rolling resistance performance and snow traction performance of the tires.

SUMMARY

The present technology provides a tire with improved rolling resistance performance and snow traction performance.

A tire according to an aspect of the present technology includes a plurality of main grooves extending in a tire circumferential direction, a land portion defined by the main grooves, a plurality of lug grooves extending through the land portion, and a plurality of blocks defined by the plurality of main grooves and the plurality of lug grooves. The main grooves include, in a meridian cross-section, a bend point where an angle of a groove wall with respect to a normal line of a tread surface changes. The plurality of blocks include a first block and a second block, where among a first main groove and a second main groove having distances differing from each other in a tire width direction from a tire equatorial plane, the first block has a first edge along the first main groove where a distance in the tire width direction is closer to the tire equatorial plane and the second block has a second edge along the second main groove where a distance in the tire width direction is farther from the tire equatorial plane. Two angles between an imaginary line obtained by extending a ridge line formed by the bend point of a groove wall on the first edge side of the first main groove and imaginary lines each obtained by extending two edges that are adjacent to each other in the tire circumferential direction with the first edge interposed therebetween among edges of a road contact surface of the first block are an acute angle θa and an obtuse angle θb, and two angles between an imaginary line obtained by extending a ridge line formed by the bend point of a groove wall on the second edge side of the second main groove and imaginary lines each obtained by extending two edges that are adjacent to each other in the tire circumferential direction with the second edge interposed therebetween among edges of a road contact surface of the second block are an acute angle θc and an obtuse angle θd, a difference between the acute angle θa and the obtuse angle θb is greater than a difference between the acute angle θc and the obtuse angle θd.

A difference of angles between groove walls on both sides of the first main groove with respect to the normal line of the tread surface in a meridian cross-section of the first main groove at positions of two points where intersection points of the imaginary lines obtained by extending each of the two edges that are adjacent to each other in the tire circumferential direction with the first edge interposed therebetween and a groove center line of the first main groove are moved along the groove center line by a predetermined distance in a direction approaching each other are greater than a difference of angles between groove walls on both sides of the second main groove with respect to the normal line of the tread surface in a meridian cross-section of the second main groove at positions of two points where intersection points of the imaginary lines obtained by extending each of the two edges that are adjacent to each other in the tire circumferential direction with the second edge interposed therebetween and a groove center line of the second main groove are moved along the groove center line by a predetermined distance in a direction approaching each other.

A ratio of a maximum distance between the groove walls of the second main groove at the two points along the groove center line of the second main groove to a maximum distance between the groove walls of the first main groove at the two points along the groove center line of the first main groove is preferably 0.75 or more and 0.95 or less, and a ratio of a distance between the ridge lines at the two points along the groove center line of the second main groove to a distance between the ridge lines at the two points along the groove center line of the first main groove is preferably 0.95 or more and 1.05 or less.

A ratio of a maximum distance between the groove walls of the second main groove at the two points along the groove center line of the second main groove to a maximum distance between the groove walls of the first main groove at the two points along the groove center line of the first main groove is preferably 0.75 or more and 0.95 or less, and a ratio of a distance between the ridge lines at the two points along the groove center line of the second main groove to a distance between the ridge lines at the two points along the groove center line of the first main groove is preferably 0.95 or more and 1.05 or less.

A ratio of a length of the second block along the tire circumferential direction to a length of the first block along the tire circumferential direction is preferably 0.75 or more and 0.95 or less.

The groove center lines of the first main groove and the second main groove in a tread plan view have a zigzag shape with an amplitude in the tire width direction, wherein the zigzag shape of the groove center line of the first main groove is formed by repeating connections between a plurality of linear portions, a ratio of a length in the tire circumferential direction of the linear portions to a length in the tire circumferential direction of one pitch of the zigzag shape is 0.45 or more and 0.55 or less, the zigzag shape of the groove center line of the second main groove is formed by repeating connections between a long portion and a short portion having mutually different lengths in the tire circumferential direction, and a ratio of a length in the tire circumferential direction of the long portion to a length in the tire circumferential direction of one pitch of the zigzag shape by the long portion and the short portion is preferably 0.50 or more and 0.60 or less.

In a tread plan view, a ratio of an amplitude in the tire width direction of a center line of a zigzag shape of an edge portion of a tread contact surface along the first main groove to a developed tread width is preferably 0.005 or more and 0.020 or less, and in a tread plan view, a ratio of an amplitude in the tire width direction of a center line of a zigzag shape of an edge portion of a tread contact surface along the second main groove to the developed tread width is preferably 0.005 or more and 0.020 or less.

In a tread plan view, a ratio of an amplitude in the tire width direction of a center line of a zigzag shape of the ridge line along the first main groove to a developed tread width is preferably 0.005 or more and 0.030 or less, and in a tread plan view, a ratio of an amplitude in the tire width direction of a center line of a zigzag shape of the ridge line along the second main groove to the developed tread width is preferably 0.005 or more and 0.030 or less.

A ratio of an area of a road contact surface of the second block to an area of a road contact surface of the first block is preferably 0.87 or more and 0.97 or less.

A first groove width of the lug groove at a midpoint of a distance in the tire width direction between intersection points of two imaginary lines obtained by extending each of edges of the first block defined by the main grooves that are adjacent each other in the tire width direction and a groove center line of the lug groove is less than a second groove width of the lug groove at a midpoint of a distance in the tire width direction between intersection points of two imaginary lines obtained by extending each of edges of the second block defined by the main grooves that are adjacent to each other in the tire width direction and a groove center line of the lug groove, and the ratio of the second groove width to the first groove width is preferably 1.05 or more and 1.50 or less.

A raised bottom portion that is provided in a region including the midpoint of the lug grooves and raises a groove bottom of the lug grooves to make a groove depth shallower than other portions is preferably included, and a ratio of the groove depth of the lug groove in the portion where the raised bottom portion is provided to the groove depths of the first main groove and the second main groove is preferably 0.15 or more and 0.35 or less.

Chamfered portions respectively provided on both end portions in the tire circumferential direction of the first edge and chamfered portions respectively provided on both end portions in the tire circumferential direction of the second edge are preferably included.

Each of the plurality of blocks preferably includes at least one bent portion, and has a bent shape that projects to an inner side of the blocks in a plan view.

The tire according to embodiments of the present technology can improve rolling resistance performance and snow traction performance.

DETAILED DESCRIPTION

Embodiments of the present technology are described in detail below with reference to the drawings. In the embodiments described below, identical or substantially similar components to those of other embodiments have identical reference signs, and descriptions of those components are either simplified or omitted. The present technology is not limited by the embodiments. Constituents of the embodiments include elements that are essentially identical or that can be substituted or easily conceived by one skilled in the art. Note that it is possible to combine the configurations described below as desired. Moreover, various omissions, substitutions, and changes to the configurations can be carried out within the scope of the present technology.

Figure 1:
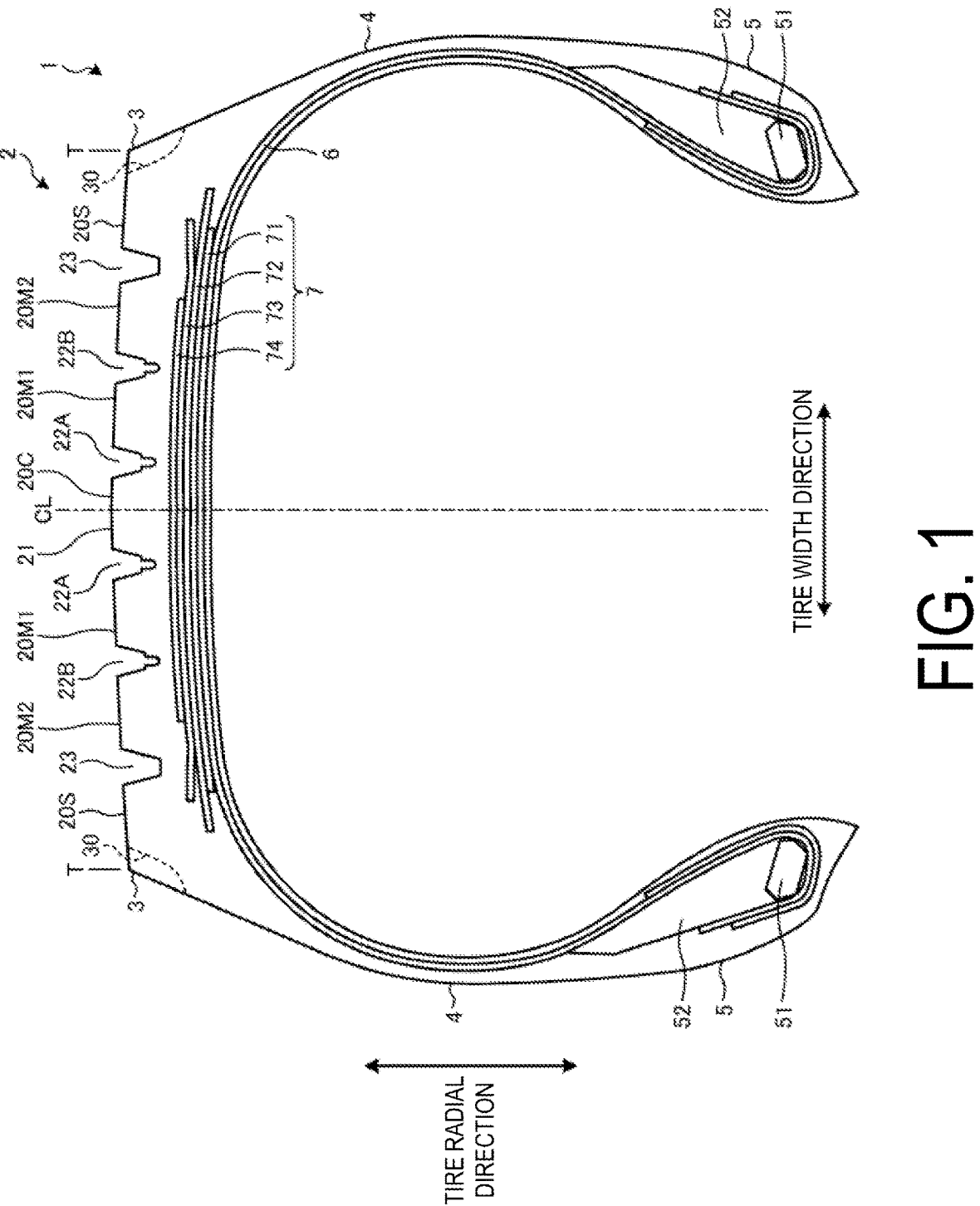
FIG. 1 is a meridian cross-sectional view of a tire according to an embodiment.
Figure 2:
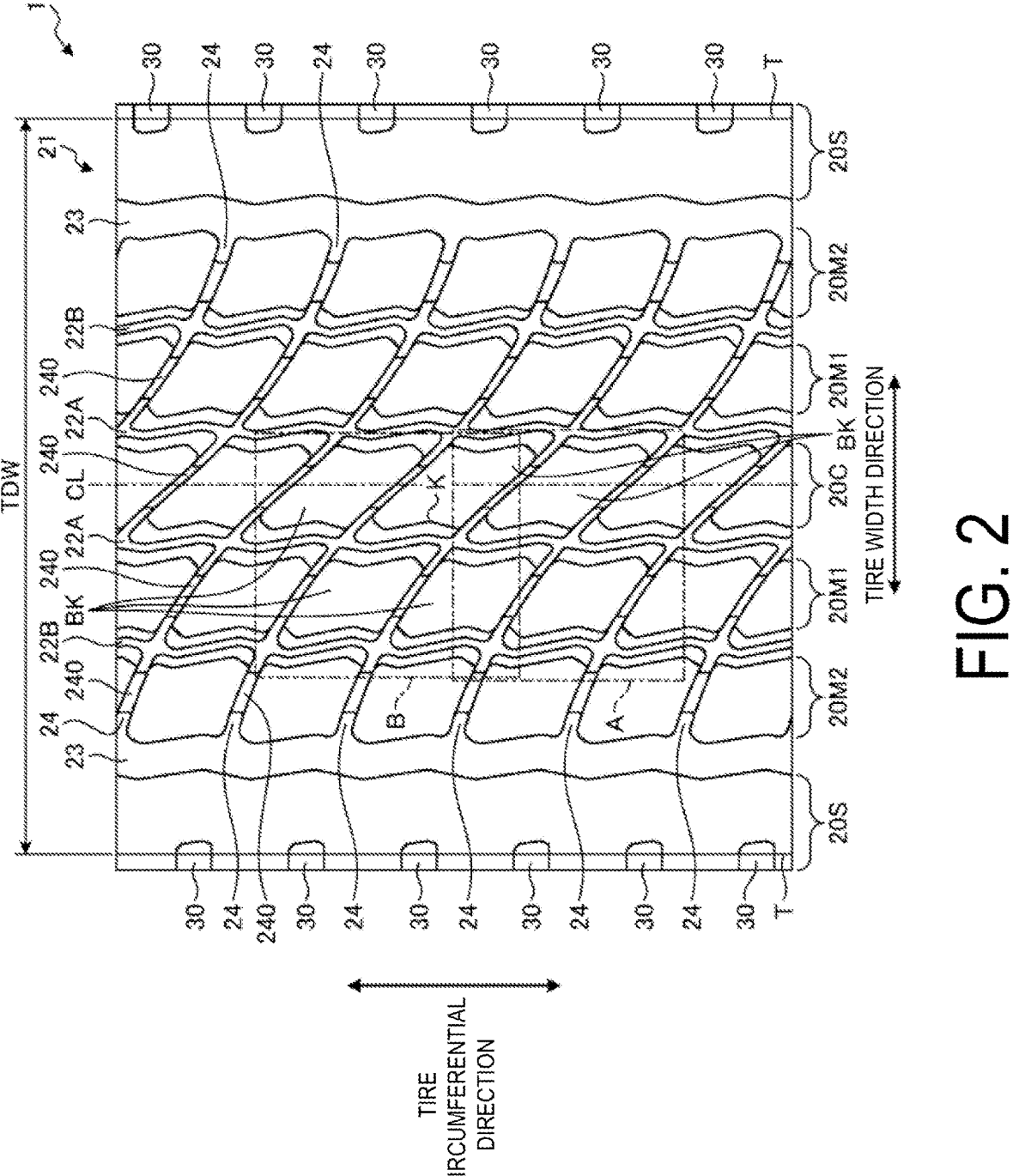
FIG. 2 is a plan view illustrating a tread surface of a tire according to the present embodiment.

FIG. 1 is a meridian cross-sectional view of a tire 1 according to the present embodiment. FIG. 2 is a plan view of a tread surface of the tire 1 according to the present embodiment. The tire 1 according to the present embodiment is preferably a pneumatic tire. In addition to ordinary air or air with an adjusted oxygen partial pressure, inert gasses such as nitrogen, argon, and helium can be used as the gas with which the tire 1 is filled.

In the description below, "tire meridian section" is defined as a cross-section of the tire taken along a plane that includes the tire rotation axis (not illustrated). The tire radial direction refers to a direction orthogonal to the rotation axis (not illustrated) of the tire 1, the inner side in the tire radial direction refers to the side toward the rotation axis in the tire radial direction, and the outer side in the tire radial direction refers to the side away from the rotation axis in the tire radial direction. Moreover, the tire circumferential direction refers to the circumferential direction with the rotation axis as the central axis. Additionally, the tire width direction refers to a direction parallel with the rotation axis, the inner side in the tire width direction refers to a side toward the tire equatorial plane (tire equator line) CL in the tire width direction, and the outer side in the tire width direction refers to a side away from the tire equatorial plane CL in the tire width direction. The tire equatorial plane CL is a plane that is orthogonal to the rotation axis of the tire 1 and passes through the center of the tire width of the tire 1, and in the tire equatorial plane CL, the center line in the tire width direction, which is the center position of the tire 1 in the tire width direction, coincides with the position in the tire width direction. "Tire width" is the width in the tire width direction between portions located on the outermost sides in the tire width direction, or in other words, the distance between the portions that are the most distant from the tire equatorial plane CL in the tire width direction. "Tire equator line" refers to a line along the tire circumferential direction of the tire 1 that lies on the tire equatorial plane CL. In the present embodiment, the tire equator line and the tire equatorial plane are denoted by the same reference sign CL.

As illustrated in FIG. 1, the tire 1 of the present embodiment includes a tread portion 2, shoulder portions 3 on both outer sides in the tire width direction of the tread portion 2, and sidewall portions 4 and bead portions 5 continuously formed in that order from the shoulder portions 3. Furthermore, the tire 1 includes a carcass layer 6 and a belt layer 7.

In FIG. 1, the shoulder portions 3 are portions of the tread portion 2 located on both outer sides in the tire width direction. Additionally, the sidewall portions 4 are exposed on the outermost sides of the tire 1 in the tire width direction. The bead portions 5 each include a bead core 51 and a bead filler 52. The bead core 51 is formed by winding a bead wire, which is a steel wire, into an annular shape. The bead filler 52 is a rubber material disposed in a space formed when an end portion in the tire width direction of the carcass layer 6 is folded back toward the outer side in the tire width direction at the position of the bead core 51.

The end portions of the carcass layer 6 in the tire width direction are folded back around the pair of bead cores 51 from an inner side in the tire width direction to an outer side in the tire width direction, and the carcass layer 6 is stretched in a toroidal shape in the tire circumferential direction to form the framework of the tire. The carcass layer 6 is made of coating rubber-covered carcass cords (not illustrated) disposed side by side with an angle with respect to the tire circumferential direction along the tire meridian direction at an angle with respect to the tire circumferential direction. The carcass cords are made of steel or organic fibers (polyester, rayon, nylon, or the like).

The belt layer 7 has a multilayer structure in which four layers of belts 71, 72, 73, 74 are layered, for example, and in the tread portion 2, is disposed on the outer side in the tire radial direction, which is the outer circumference, of the carcass layer 6, covering the carcass layer 6 in the tire circumferential direction.

The belts 71, 72, 73, 74 are made of coating rubber-covered cords (not illustrated) disposed side by side at a predetermined angle with respect to the tire circumferential direction. The cords are made of steel or organic fibers (polyester, rayon, nylon, or the like).

The tread portion 2 is made of a rubber material (tread rubber) and is exposed on the outermost side of the tire 1 in the tire radial direction, with the surface thereof constituting the contour of the tire 1. A tread surface 21 is formed on an outer circumferential surface of the tread portion 2, in other words, on a road contact surface that comes into contact with a road surface when running. A plurality (six in the present embodiment) of circumferential main grooves 22A, 22B, and 23 extending in the tire circumferential direction are provided in the tread surface 21. A plurality (seven in the present embodiment) of land portions 20C, 20M1, 20M2, and 20S defined by the plurality of circumferential main grooves 22A, 22B, and 23 extending in the tire circumferential direction, and arranged in the tire width direction are provided in the tread surface 21.

The circumferential main groove 22A is the circumferential main groove closest to the tire equator line CL. The circumferential main groove 22B is the circumferential main groove that is second closest to the tire equator line CL. The circumferential main groove 22B is a circumferential main groove provided in the outer side in the tire width direction of the circumferential main groove 22A. The circumferential main groove 23 is a circumferential main groove provided in the outer side in the tire width direction of the circumferential main groove 22B. The circumferential main groove 23 is the circumferential main groove closest to the tire ground contact edge T. "Main groove" refers to a groove on which a wear indicator must be provided as specified by JATMA (The Japan Automobile Tyre Manufacturers Association, Inc.). Note that the length TDW in the tire width direction between the tire ground contact edges T is the developed tread width.

The land portion 20C is provided between the circumferential main grooves 22A and 22A that are adjacent to each other with the tire equator line CL interposed therebetween. The land portion 20C is defined by the two circumferential main grooves 22A and 22A. The land portion 20M1 is provided between the circumferential main groove 22A and the circumferential main groove 22B. The land portion 20M1 is defined by the circumferential main groove 22A and the circumferential main groove 22B. The land portion 20M2 is provided between the circumferential main groove 22B and the circumferential main groove 23. The land portion 20M2 is defined by the circumferential main groove 22B and the circumferential main groove 23. The land portion 20S is provided on the outer side in the tire width direction of the circumferential main groove 23. In the following description, the circumferential main groove may simply be referred to as "main groove".

Tread Portion

The tread portion 2 will be described in detail below. Hereinafter, the groove depth is the maximum distance from the tread surface to the groove bottom and is measured when the tire is mounted on a specified rim, inflated to the specified internal pressure, and in an unloaded state. Additionally, in a configuration in which the grooves include an uneven portion or sipes on the groove bottom, the groove depth is measured excluding these portions.

As illustrated in FIG. 2, the tread portion 2 includes lug grooves 24. The lug grooves are lateral grooves extending in the tire width direction, and open when the tire comes into contact with the ground, and function as grooves. The lug grooves 24 extend in a direction intersecting the circumferential main grooves 22A and 22B, and are provided side by side in the tire circumferential direction. Each of the lug grooves 24 extends in the tire width direction from one main groove 23 to the other main groove 23. Each of the lug grooves 24 extends from one main groove 23 in the tire width direction, sequentially passes through the land portion 20M2, the land portion 20M1, the land portion 20C, the land portion 20M1, and the land portion 20M2, and opens to the other main groove 23.

The land portion 20C includes lug grooves 24 that connect to the circumferential main groove 22A and the circumferential main groove 22B to join the circumferential main groove 22A and the circumferential main groove 22B. The land portion 20S is defined on the outer side in tire width direction of the circumferential main groove 23, and is disposed on the outermost side of the tread portion 2 in the tire width direction. The land portion 20S includes lug grooves 30 on the edge portion on the outer side in the tire width direction. The lug grooves 30 are provided in the land portions 20S at a predetermined pitch in the tire circumferential direction. The end portion of the lug groove 30 on the side closer to the tire equatorial plane CL terminates in the land portion 20S. The end portion of the lug groove 30 on the side farther from the tire equatorial plane CL extends beyond the tire ground contact edge T in the tire width direction and opens to the shoulder portion 3.

The tire ground contact edge T is defined as the maximum width position in the tire axial direction of the contact surface between the tire and a flat plate when the tire is mounted on a specified rim, inflated to the specified internal pressure, placed perpendicular to the flat plate in a static state without being loaded, and loaded with a load corresponding to the specified load.

"Specified rim" refers to a "standard rim" defined by JATMA, a "Design Rim" defined by TRA (The Tire and Rim Association, Inc.), or a "Measuring Rim" defined by ETRTO (The European Tyre and Rim Technical Organisation). Additionally, "specified internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO.

As illustrated in FIG. 2, in this example, in the land portion 20C of the tread portion 2, a plurality of blocks BK are defined by the circumferential main grooves 22A, 22B, 23 and the lug grooves 24 extending in the tire width direction. As illustrated in FIG. 2, the circumferential main grooves 22A, 22B, and 23 have a zigzag shape with an amplitude in the tire width direction.

In the lug groove 24, raised bottom portions 240 are provided between blocks BK that are adjacent to each other in the tire circumferential direction. The raised bottom portion 240 is a portion where the groove bottom is raised such that the groove depth is shallower than other portions. Block The tread portion 2 includes the plurality of blocks BK. Each of the blocks BK is defined by the plurality of main grooves 22A, 22B, 23 and the plurality of lug grooves 24. Each of the blocks BK includes at least one bend point K. Thus, the blocks BK have a bent shape that projects to an inner side of the blocks BK in a plan view. Each of the blocks BK may include a plurality of bend points K.

Figure 3:
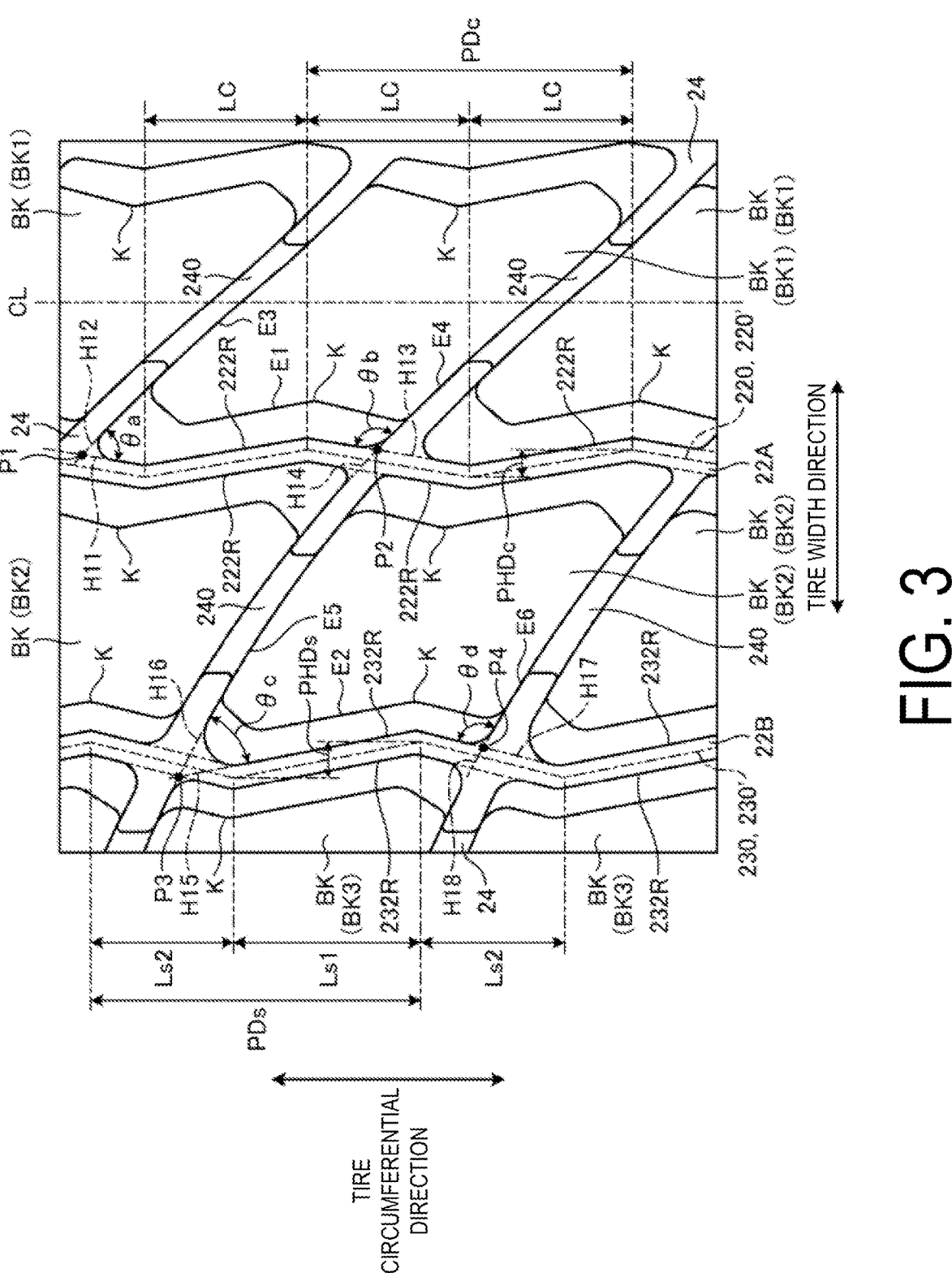
FIG. 3 is an enlarged view of a part of FIG. 2.

FIG. 3 is an enlarged view of a part of FIG. 2. FIG. 3 is an enlarged view of a part A in FIG. 2. FIG. 3 illustrates the main groove 22A and the main groove 22B which have different distances in the tire width direction from the tire equatorial plane CL, the block BK1 which is a first block having a first edge E1 along the main groove 22A that is a first main groove that is closer to the tire equatorial plane CL in the tire width direction, a second block BK2 which has a second edge E2 along the main groove 22B that is a second main groove that is farther from the tire equatorial plane CL in the tire width direction, and the block BK3 which is around the block BK1 and the second block BK2.

In FIG. 3, in a tread plan view, the groove center lines 220 and 230 of the main groove 22A and the main groove 22B both have a zigzag shape with an amplitude in the tire width direction. The zigzag shape of the groove center line 220 of the main groove 22A is formed by repeating connections between linear portions of the length LC in the tire circumferential direction. The ratio LC/PDc of the length LC in the tire circumferential direction of the linear portion to the length PDc in the tire circumferential direction of one pitch of the zigzag shape is preferably 0.45 or more and 0.55 or less.

In addition, the zigzag shape of the groove center line 230 of the main groove 22B is formed by repeating connections between a long portion and a short portion that are mutually different in the lengths in the tire circumferential direction. In other words, the zigzag shape of the groove center line 230 is formed by repeating connections between the long portion of the length Ls1 in the tire circumferential direction and the short portion of the length Ls2 in the tire circumferential direction. The ratio Ls1/PDs of the length Ls1 in the tire circumferential direction of the long portion to the length PDs in the tire circumferential direction of one pitch of the zigzag shape by the long portion and the short portion is preferably 0.50 or more and 0.60 or less.

Here, by configuring the value of the ratio Ls1/PDs with respect to the main groove 22B on the outer side in the tire width direction to be greater than the value of the ratio LC/PDc with respect to the main groove 22A on the inner side in the tire width direction, snow traction performance can be improved.

The groove wall on the first edge E1 side of the main groove 22A, which is the first main groove, has a bend point where the angle of the groove wall changes. The ridge line 222R is formed by the bend point of the groove wall. The imaginary line H11 obtained by extending the ridge line 222R and the imaginary line H12 obtained by extending the edge E3 of the road contact surface of the block BK1 defined by the lug grooves 24 intersect at the point P1. The angle between the imaginary line H11 and the imaginary line H12 is denoted by θa. The angle θa is an acute angle. Furthermore, the imaginary line H13 obtained by extending the ridge line 222R and the imaginary line H14 obtained by extending the edge E4 of the road contact surface of each of the blocks BK1 defined by the lug grooves 24 intersect at the point P2. The angle between the imaginary line H13 and the imaginary line H14 is denoted by θb. The angle θb is an obtuse angle. In other words, two angles between the imaginary lines H11 and H13 obtained by extending the ridge line 222R formed by the bend point of the groove wall on the first edge E1 side and the imaginary lines H12 and H14 obtained by extending each of the two edges E3 and E4 that are adjacent to each other in the tire circumferential direction with the first edge E1 interposed therebetween among the edges of the road contact surface of the block BK1 are the angle θa of the acute angle and the angle θb of the obtuse angle.

A groove wall on the second edge E2 side of the main groove 22B, which is the second main groove, has a bend point where the angle of the groove wall changes. The ridge line 232R is formed by the bend point of the groove wall. The imaginary line H15 obtained by extending the ridge line 232R and the imaginary line H16 obtained by extending the edge E5 of the road contact surface of the block BK2 intersect at the point P3. An angle between the imaginary line H15 and the imaginary line H16 is denoted by θc. The angle θc is an acute angle. Furthermore, the imaginary line H17 obtained by extending the ridge line 232R and the imaginary line H18 obtained by extending the edge E6 of the road contact surface of the block BK2 intersect at the point P4. An angle between the imaginary line H17 and the imaginary line H18 is denoted by θd. The angle θd is an obtuse angle. In other words, two angles between the imaginary lines H15 and H17 obtained by extending the ridge line 232R formed by the bend point of the groove wall on the second edge E2 side and the imaginary lines H16 and H18 obtained by extending each of the two edges E5 and E6 that are adjacent to each other in the tire circumferential direction with the second edge E2 interposed therebetween among the edges of the road contact surface of the block BK2, are the angle θc of the acute angle and the angle θd of the obtuse angle.

Here, the four angles θa, θb, θc, and θd have the following relationship (1).

$$(\theta d - \theta c) < (\theta b - \theta a) \tag{1}$$

In other words, in a case where the two angles between the imaginary lines H11 and H13 obtained by extending the ridge line 222R formed by the bend point of the groove wall on the first edge E1 side of the main groove 22A and the imaginary lines H12 and H14 obtained by extending each of the two edges E3 and E4 that are adjacent to each other in the tire circumferential direction with the first edge E1 interposed therebetween are the acute angle θa and the obtuse angle θb, and the two angles between the imaginary lines H15 and H17 obtained by extending the ridge line 232R formed by the bend point of the groove wall on the second edge E2 side of the main groove 22B and the imaginary lines H16 and H18 obtained by extending each of the two edges E5 and E6 that are adjacent to each other in the tire circumferential direction with the second edge E2 interposed therebetween are the acute angle θc and the obtuse angle θd, and a difference between the acute angle θa and the obtuse angle θb is greater than a difference between the acute angle θc and the obtuse angle θd. Since the four angles θa, θb, θc, and θd have such a relationship, the rigidity of the block BK can be increased and the amount of deformation of the block BK can be reduced. In this way, rolling resistance performance can be improved.

Meridian Cross-Section of Main Groove

Figure 4:
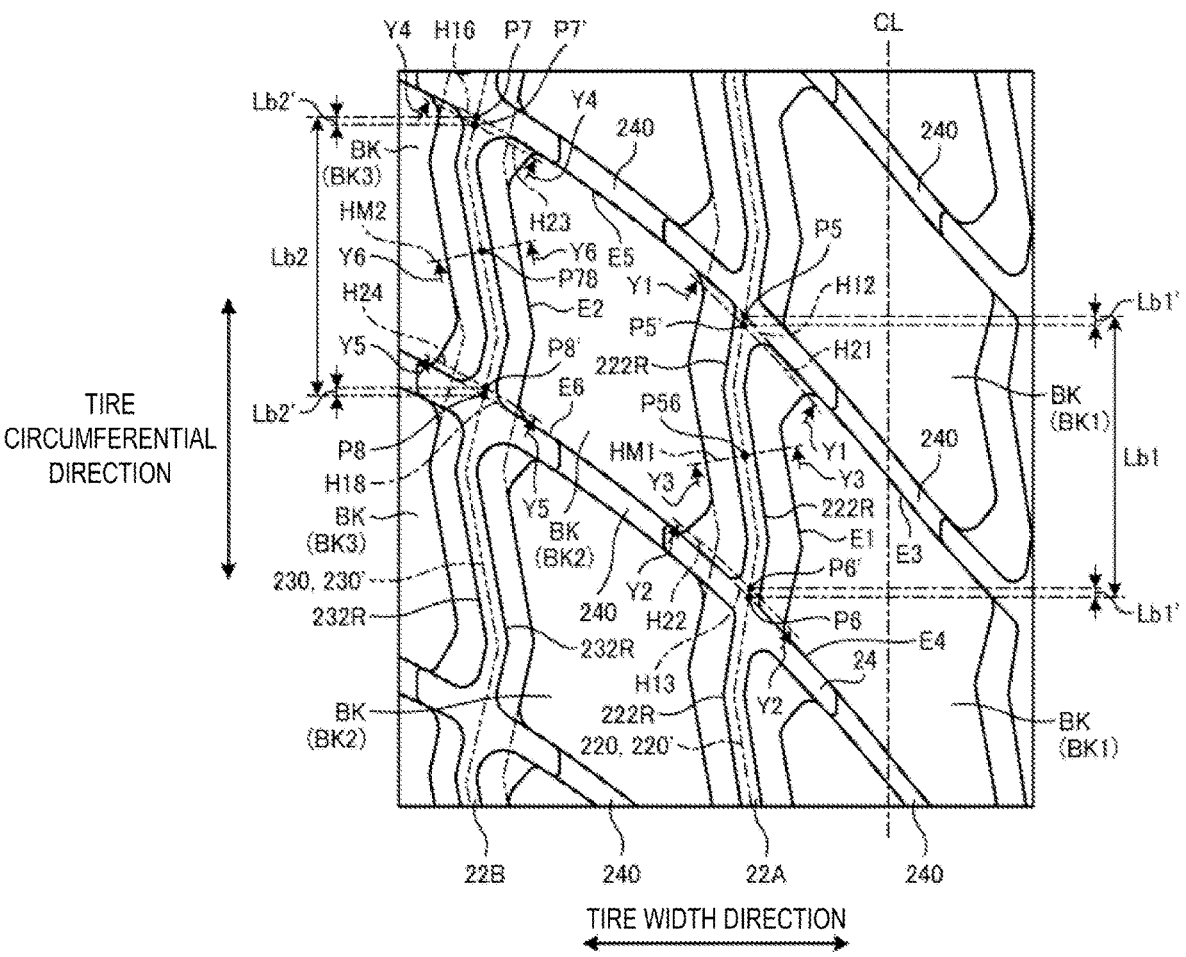
FIG. 4 is an enlarged view of a part of FIG. 2.
Figure 5:
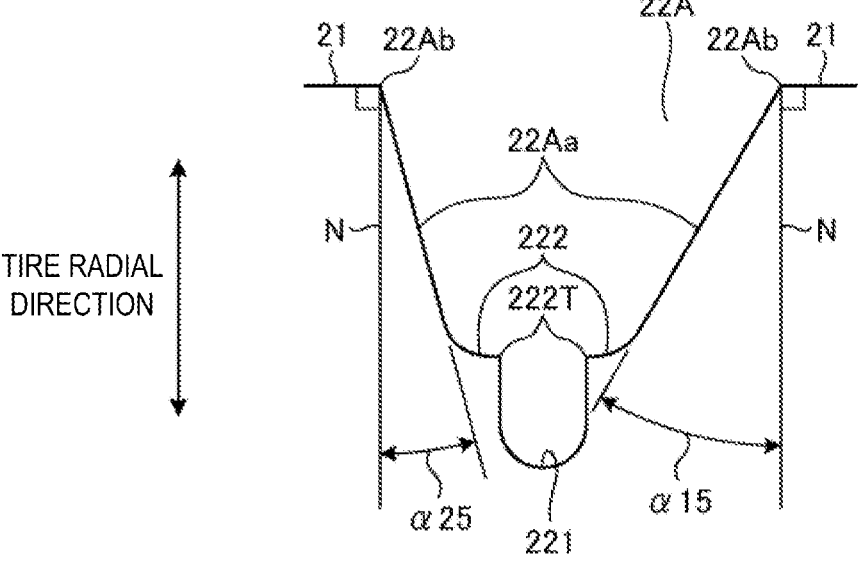
FIG. 5 is a view illustrating an example of a cross-sectional shape of a main groove in FIG. 4.
Figure 6:
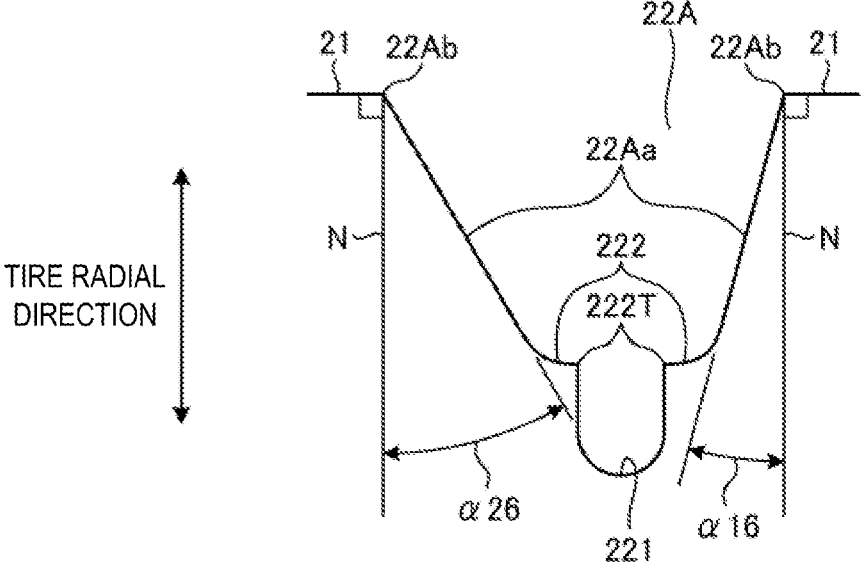
FIG. 6 is a view illustrating an example of a cross-sectional shape of a main groove in FIG. 4.
Figure 7:
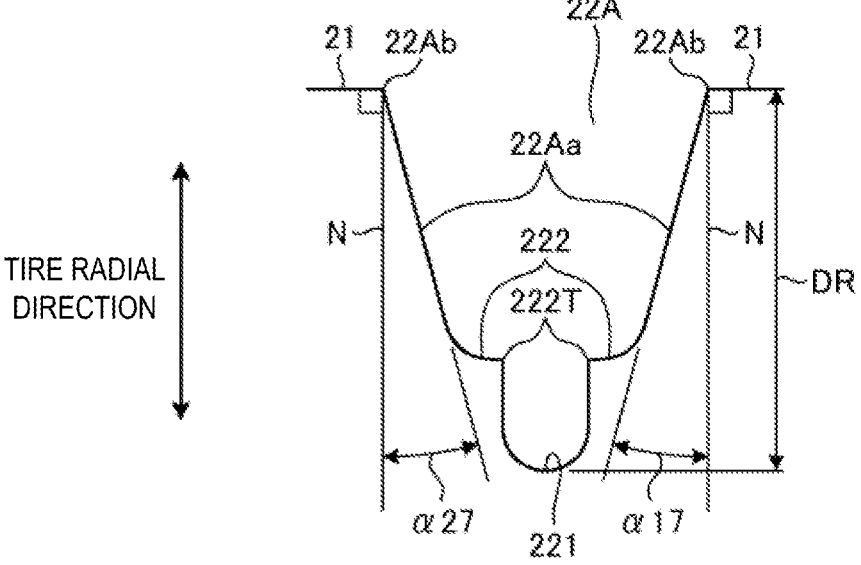
FIG. 7 is a view illustrating an example of a cross-sectional shape of a main groove in FIG. 4.

Next, an example of the cross-sectional shape of the main groove 22A and 22B will be described. FIG. 4 is an enlarged view of a part of FIG. 2. FIG. 4 is an enlarged view of a part B in FIG. 2. FIGS. 5 to 7 are views illustrating examples of cross-sectional shapes of the main groove 22A in FIG. 4. FIG. 5 is a view illustrating a cross-sectional shape of the main groove 22A at a point P5' in FIG. 4. FIG. 6 is a view illustrating a cross-sectional shape of the main groove 22A at a point P6' in FIG. 4. FIG. 7 is a view illustrating a cross-sectional shape of the main groove 22A at a point P56 in FIG. 4.

In FIG. 4, intersection points between the imaginary lines H12 and H13 and the groove center line 220 of the main groove 22A are denoted by the points P5 and P6, the imaginary line H12 and the imaginary line H13 being obtained by extending each of the two edges E3 and E4 that are adjacent to each other in the tire circumferential direction with the edge E1 interposed therebetween among the edges of the road contact surface of the block BK1 defined by the lug grooves 24. The point P5' is a point where the point P5 is moved by a predetermined distance Lb1' in a direction approaching the point P6. The point P6' is a point where the point P6 is moved by a predetermined distance Lb1' in a direction approaching the point P5. The point P56 is the midpoint of the length Lb1 in the tire circumferential direction from the point P5 to the point P6.

FIG. 5 is a cross-sectional view at the point P5' in FIG. 4, viewed from the direction of the arrow Y1, cutting the main groove 22A along the imaginary line H21 parallel to the imaginary line H12. As illustrated in FIG. 5, the step portion 222 is provided on the way from the groove opening end portion 22Ab to the tread surface 21 of the main groove 22A toward the groove bottom 221. The end portion 222T on the groove center side of the step portion 222 constitutes a bend point where, in a meridian cross-section, the angle of the groove wall 22Aa with respect to the normal line N of the tread surface 21 changes. In other words, the groove wall 22Aa has a bend point. The bend point constituted by the end portion 222T in FIG. 5, which is the cross-sectional view of the main groove 22A, is seen as the ridge line 222R in FIG. 4, which is a plan view.

In FIG. 5, the angles of the groove walls 22Aa on both sides of the main groove 22A with respect to the normal line N of the tread surface are denoted by α15 and α25. The angle α15 is 30 degrees, for example. The angle α25 is 15 degrees, for example. Thus, in the present example, the angle difference between the angle α15 and the angle α25 is 15 degrees. The angle difference between the angle α15 and the angle α25 is preferably 1 degree or more and 15 degrees or less. When the angle difference exceeds 15 degrees, block rigidity becomes non-uniform and rolling resistance performance decreases, which is not preferable.

FIG. 6 is a view illustrating a cross-sectional shape of the main groove 22A at the point P6' in FIG. 4, viewed from the direction of the arrow Y2, cutting the main groove 22A along the imaginary line H22 parallel to the imaginary line H13. As in FIG. 5, the end portion 222T constitutes a bend point where, in a meridian cross-section, the angle of the groove wall 22Aa with respect to the normal line N of the tread surface 21 changes. The bend point constituted by the end portion 222T in FIG. 6 is seen as the ridge line 222R in FIG. 4, which is a plan view.

In FIG. 6, the angles of the groove walls 22Aa on both sides of the main groove 22A with respect to the normal line N of the tread surface are denoted by α16 and α26. The angle α16 is 15 degrees, for example. The angle α26 is 30 degrees, for example. Thus, in the present example, the angle difference between the angle α16 and the angle α26 is 15 degrees. The angle difference between the angle α16 and the angle α26 is preferably 1 degree or more and 15 degrees or less. When the angle difference exceeds 15 degrees, block rigidity becomes non-uniform and rolling resistance performance decreases, which is not preferable.

FIG. 7 is a view illustrating a cross-sectional shape of the main groove 22A at the point P56 in FIG. 4, viewed from the direction of the arrow Y3, cutting the main groove 22A along the imaginary line HM1 orthogonal to the groove center line 220. As in FIGS. 5 and 6, the end portion 222T constitutes a bend point where, in a meridian cross-section, the angle of the groove wall 22Aa with respect to the normal line N of the tread surface 21 changes. The bend point constituted by the end portion 222T in FIG. 7 is seen as the ridge line 222R in FIG. 4, which is a plan view.

In FIG. 7, the angles of the groove walls 22Aa on both sides of the main groove 22A with respect to the normal line N of the tread surface are denoted by α17 and α27. The angle α17 is 15 degrees, for example. The angle α27 is 15 degrees, for example. In other words, the angle α17 and the angle α27 are equal. In other words, at the point P56, which is the midpoint between the two points P5 and P6 along the groove center line 220, the angles of the groove walls 22Aa on both sides of the main groove 22A with respect to the normal line N of the tread surface 21 are equal. Since the angles are equal at the point P56, the rigidity of the block BK on both sides of the main groove 22A can be maintained, and rolling resistance performance and snow traction performance can be improved.

Figure 8:
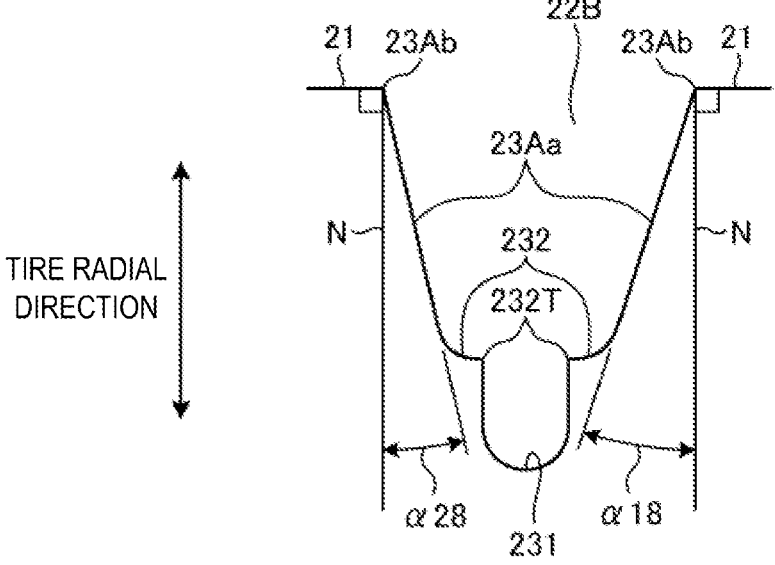
FIG. 8 is a view illustrating an example of a cross-sectional shape of a main groove in FIG. 4.
Figure 9:
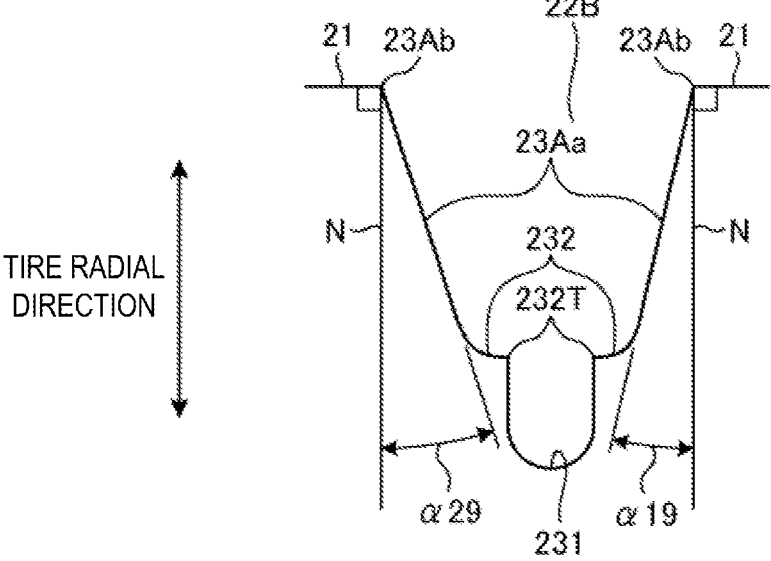
FIG. 9 is a view illustrating an example of a cross-sectional shape of a main groove in FIG. 4.
Figure 10:
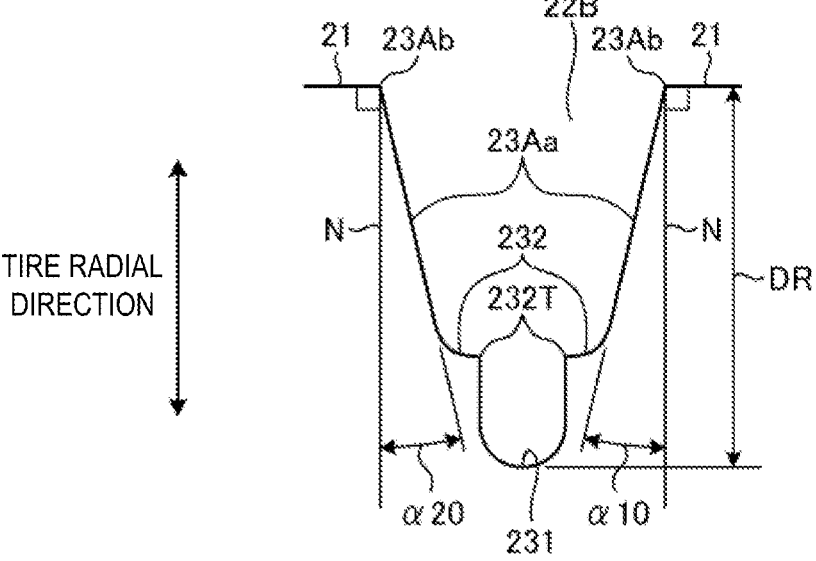
FIG. 10 is a view illustrating an example of a cross-sectional shape of a main groove in FIG. 4.

FIGS. 8 to 10 are views illustrating examples of cross-sectional shapes of the main groove 22B in FIG. 4. FIG. 8 is a view illustrating a cross-sectional shape of the main groove 22B at a point P7' in FIG. 4. FIG. 9 is a view illustrating a cross-sectional shape of the main groove 22B at a point P8' in FIG. 4. FIG. 10 is a view illustrating a cross-sectional shape of the main groove 22B at a point P78 in FIG. 4.

In FIG. 4, intersection points between the imaginary lines H16 and H18 and the groove center line 230 of the main groove 22B are denoted by the points P7 and P8, the imaginary line H16 and the imaginary line H18 being obtained by extending each of the two edges E5 and E6 that are adjacent to each other in the tire circumferential direction with the edge E2 interposed therebetween among the edges of the road contact surface of the block BK2 defined by the lug grooves 24. The point P7' is a point where the point P7 is moved by a predetermined distance Lb2' in a direction approaching the point P8. The point P8' is a point where the point P8 is moved by a predetermined distance Lb2' in a direction approaching the point P7. The point P78 is the midpoint of the length Lb2 in the tire circumferential direction from the point P7 to the point P8.

FIG. 8 is a cross-sectional view at the point P7' in FIG. 4, viewed from the direction of the arrow Y4, cutting the main groove 22B along the imaginary line H23 parallel to the imaginary line H16. As illustrated in FIG. 8, the step portion 232 is provided on the way from the groove opening end portion 23Ab to the tread surface 21 of the main groove 22B toward the groove bottom 231. The end portion 232T on the groove center side of the step portion 232 constitutes a bend point where, in a meridian cross-section, the angle of the groove wall 23Aa with respect to the normal line N of the tread surface 21 changes. In other words, the groove wall 23Aa has a bend point. The bend point constituted by the end portion 232T in FIG. 8 is seen as the ridge line 232R in FIG. 4, which is a plan view.

In FIG. 8, the angles of the groove walls 23Aa on both sides of the main groove 22B with respect to the normal line N of the tread surface are denoted by α18 and α28. The angle α18 is 18 degrees, for example. The angle α28 is 13 degrees, for example. Thus, in the present example, the angle difference between the angle α18 and the angle α28 is 5 degrees. The angle difference between the angle α18 and the angle α28 is preferably 1 degree or more and 15 degrees or less. When the angle difference exceeds 15 degrees, block rigidity becomes non-uniform and rolling resistance performance decreases, which is not preferable.

Note that the angle difference between the angle α15 and the angle α25, described with reference to FIG. 5, is greater than the angle difference between the angle α18 and the angle α28. By increasing the angle difference on the inner side in the tire width direction and by reducing the angle difference on the outer side in the tire width direction, rolling resistance performance can be improved.

FIG. 9 is a view illustrating a cross-sectional shape of the main groove 22B at the point P8' in FIG. 4, viewed from the direction of the arrow Y5, cutting the main groove 22B along the imaginary line H24 parallel to the imaginary line H18. As in FIG. 8 the end portion 232T constitutes a bend point where, in a meridian cross-section, the angle of the groove wall 23Aa with respect to the normal line N of the tread surface 21 changes. The bend point constituted by the end portion 232T in FIG. 9 is seen as the ridge line 232R in FIG. 4, which is a plan view.

In FIG. 9, the angles of the groove walls 23Aa on both sides of the main groove 22B with respect to the normal line N of the tread surface are denoted by α19 and α29. The angle α19 is 13 degrees, for example. The angle α29 is 18 degrees, for example. Thus, in the present example, the angle difference between the angle α19 and the angle α29 is 5 degrees. The angle difference between the angle α19 and the angle α29 is preferably 1 degree or more and 15 degrees or less. When the angle difference exceeds 15 degrees, block rigidity becomes non-uniform and rolling resistance performance decreases, which is not preferable.

Note that the angle difference between the angle α16 and the angle α26, described with reference to FIG. 6, is greater than the angle difference between the angle α19 and the angle α29. By increasing the angle difference on the inner side in the tire width direction and by reducing the angle difference on the outer side in the tire width direction, rolling resistance performance can be improved.

FIG. 10 is a view illustrating a cross-sectional shape of the main groove 22B at the point P78 in FIG. 4, viewed from the direction of the arrow Y6, cutting the main groove 22B along the imaginary line HM2 orthogonal to the groove center line 230. As in FIGS. 8 and 9, the end portion 232T constitutes a bend point where, in a meridian cross-section, the angle of the groove wall 23Aa with respect to the normal line N of the tread surface 21 changes. The bend point constituted by the end portion 232T in FIG. 10 is seen as the ridge line 232R in FIG. 4, which is a plan view.

In FIG. 10, the angles of the groove walls 23Aa on both sides of the main groove 22B with respect to the normal line N of the tread surface are denoted by α10 and α20. The angle α10 is 13 degrees, for example. The angle α20 is 13 degrees, for example. In other words, the angle α10 and the angle α20 are equal. In other words, at the point P78, which is the midpoint between the two points P7 and P8 along the groove center line 230, the angles of the groove walls 23Aa on both sides of the main groove 22B with respect to the normal line N of the tread surface 21 are equal. Since the angles are equal at the point P78, the rigidity of the block BK on both sides of the main groove 22B can be maintained, and rolling resistance performance and snow traction performance can be improved.

Returning to FIG. 4, the predetermined distance Lb1' described above is, for example, a length corresponding to 3% along the tire circumferential direction of the length Lb1 along the tire circumferential direction from the point P5 to the point P6. In other words, the ratio Lb1'/Lb1 is 0.03. Furthermore, the predetermined distance Lb2' described above is, for example, a length corresponding to 3% along the tire circumferential direction of the length Lb2 along the tire circumferential direction from the point P7 to the point P8. In other words, the ratio Lb2'/Lb2 is 0.03.

Additionally, in FIG. 4, the ratio of the maximum distance between the wall surfaces of the main groove 22B at the two points P7' and P8' along the groove center line 230 of the main groove 22B with respect to the maximum distance between the wall surfaces of the main groove 22A at the two points P5' and P6' along the groove center line 220 of the main groove 22A is preferably 0.75 or more and 0.95 or less.

Additionally, the ratio of the distance between the ridge lines 232R at the two points P7' and P8' along the groove center line 230 of the main groove 22B with respect to the distance between the ridge lines 222R at the two points P5' and P6' along the groove center line 220 of the main groove 22A is preferably 0.95 or more and 1.05 or less.

Since, in the tread contact surface, the groove width on the inner side in the tire width direction is greater than the groove width on the outer side in the tire width direction, the snow can be compacted when grounded, and the snow traction performance can be improved. When the groove width on the inner side in the tire width direction is less than the groove width on the outer side in the tire width direction, the groove is narrow and thus snow traction performance cannot be exhibited when grounded, which is not preferable.

Figure 11:
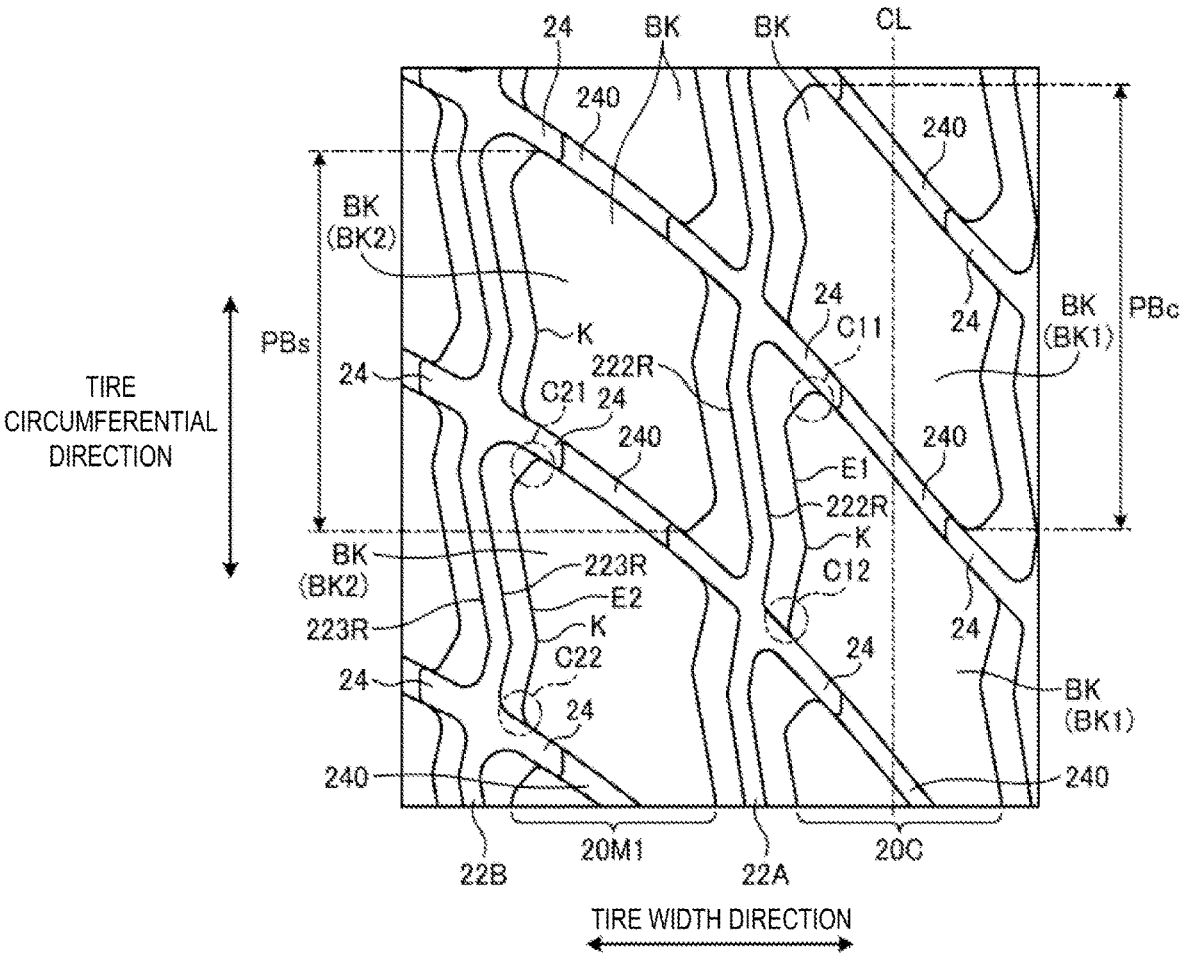
FIG. 11 is an enlarged view of a part of FIG. 2.

FIG. 11 is an enlarged view of a part of FIG. 2. FIG. 11 is an enlarged view of a part B in FIG. 2. In FIG. 11, the block BK1 and the block BK2 have different distances in the tire width direction from the tire equatorial plane CL. The block BK1 is closer to the tire equatorial plane CL than the block BK2. The length of the block BK1 along the tire circumferential direction is denoted by PBc. The length of the block BK2 along the tire circumferential direction is denoted by PBs. At this time, the ratio PBs/PBc of the length PBs to the length PBc is preferably 0.75 or more and 0.95 or less. When the ratio PBs/PBc is less than 0.75, the ground contact surface pressure is biased between the inner side and the outer side, and rolling performance is degraded, which is not preferable. When the ratio PBs/PBc is greater than 0.95, the groove area ratio is low, and snow traction performance is degraded, which is not preferable.

Additionally, as illustrated in FIG. 11, the block BK1 preferably includes chamfered portions C11 and C12 respectively provided on both end portions in the tire circumferential direction of the edge E1. Additionally, the block BK2 preferably includes chamfered portions C21 and C22 respectively provided on both end portions in the tire circumferential direction of the edge E2. In this way, by providing the chamfered portions C11, C12, C21, and C22 on respective both end portions in the tire circumferential direction of the edge on the outer side in the tire width direction of the block BK, the rigidity of the block BK can be maintained, and rolling resistance performance and snow traction performance can be improved.

Figure 12:
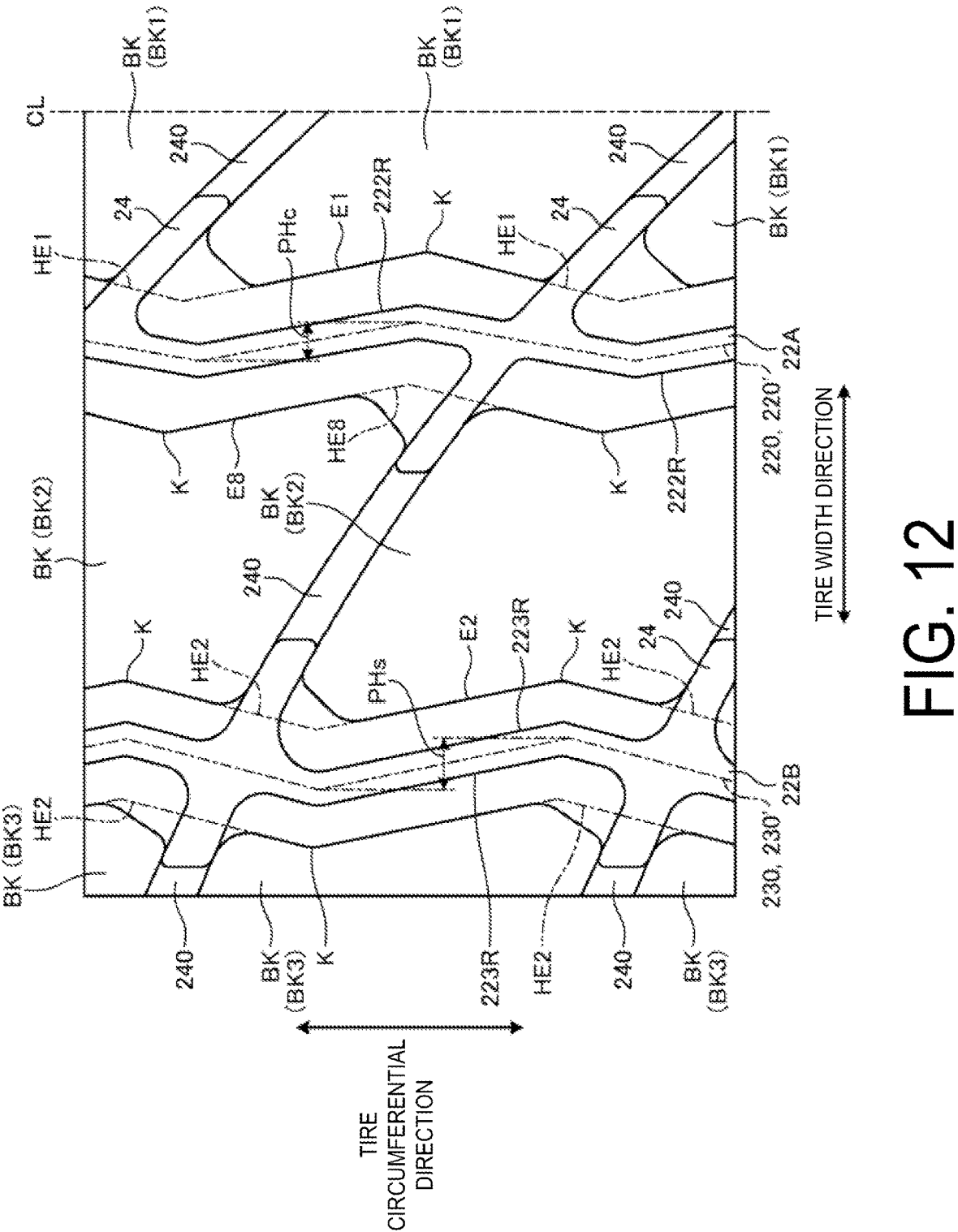
FIG. 12 is an enlarged view of a part of FIG. 4.

FIG. 12 is an enlarged view of a part of FIG. 4. In FIG. 12, when the imaginary line HE1 is drawn in the extension direction of the main groove 22A along the edge E1 of the tread contact surface of the block BK1 and the edge E8 of the tread contact surface of the opposing the block BK2, the main groove 22A has a zigzag shape. Furthermore, when the imaginary line HE2 is drawn in the extension direction of the main groove 22B along the edge E2 of the tread contact surface of the block BK2 and the edge of the tread contact surface of the opposing the block BK3, the main groove 22B has a zigzag shape.

The ratio PHc/TDW of the amplitude PHc in the tire width direction of the zigzag-shaped groove center line 220 of the main groove 22A to the developed tread width TDW is preferably 0.005 or more and 0.020 or less. Additionally, the ratio PHs/TDW of the amplitude PHs in the tire width direction of the zigzag-shaped groove center line 230 of the main groove 22B to the developed tread width TDW is preferably 0.005 or more and 0.020 or less. When the ratio PHc/TDW or the ratio PHs/TDW is less than 0.005, snow traction performance is degraded, which is not preferable. When the ratio PHc/TDW or the ratio PHs/TDW is greater than 0.020, the amount of deformation of the block BK increases and rolling performance is degraded, which is not preferable.

Returning to FIG. 3, in a tread plan view, the ratio PHDc/TDW of the amplitude PHDc in the tire width direction of the zigzag-shaped groove center line 220' of the ridge line 222R along the main groove 22A to the developed tread width TDW is preferably 0.005 or more and 0.030 or less. Additionally, in a tread plan view, the ratio PHDs/TDW of the amplitude PHDs in the tire width direction of the zigzag-shaped groove center line 230' of the ridge line 232R along the main groove 22B to the developed tread width TDW is preferably 0.005 or more and 0.030 or less. In these value ranges, stress concentration on the groove bottoms of the main grooves 22A and 22B can be reduced. Note that the zigzag-shaped center line 220' of the ridge line 222R is a line different from the zigzag-shaped groove center line 220 of the main groove 22A. In the present embodiment, since the zigzag shape of the ridge line 222R and the zigzag shape of the main groove 22A are similar, the center line 220' and the groove center line 220 coincide with each other in FIG. 3. In a case where the zigzag shapes of both are not similar, the center line 220' and the groove center line 220 are different lines (not illustrated). The same applies to the relationship between the zigzag-shaped center line 230' of the ridge line 232R and the zigzag-shaped groove center line 230 of the main groove 22B.

Figure 13:
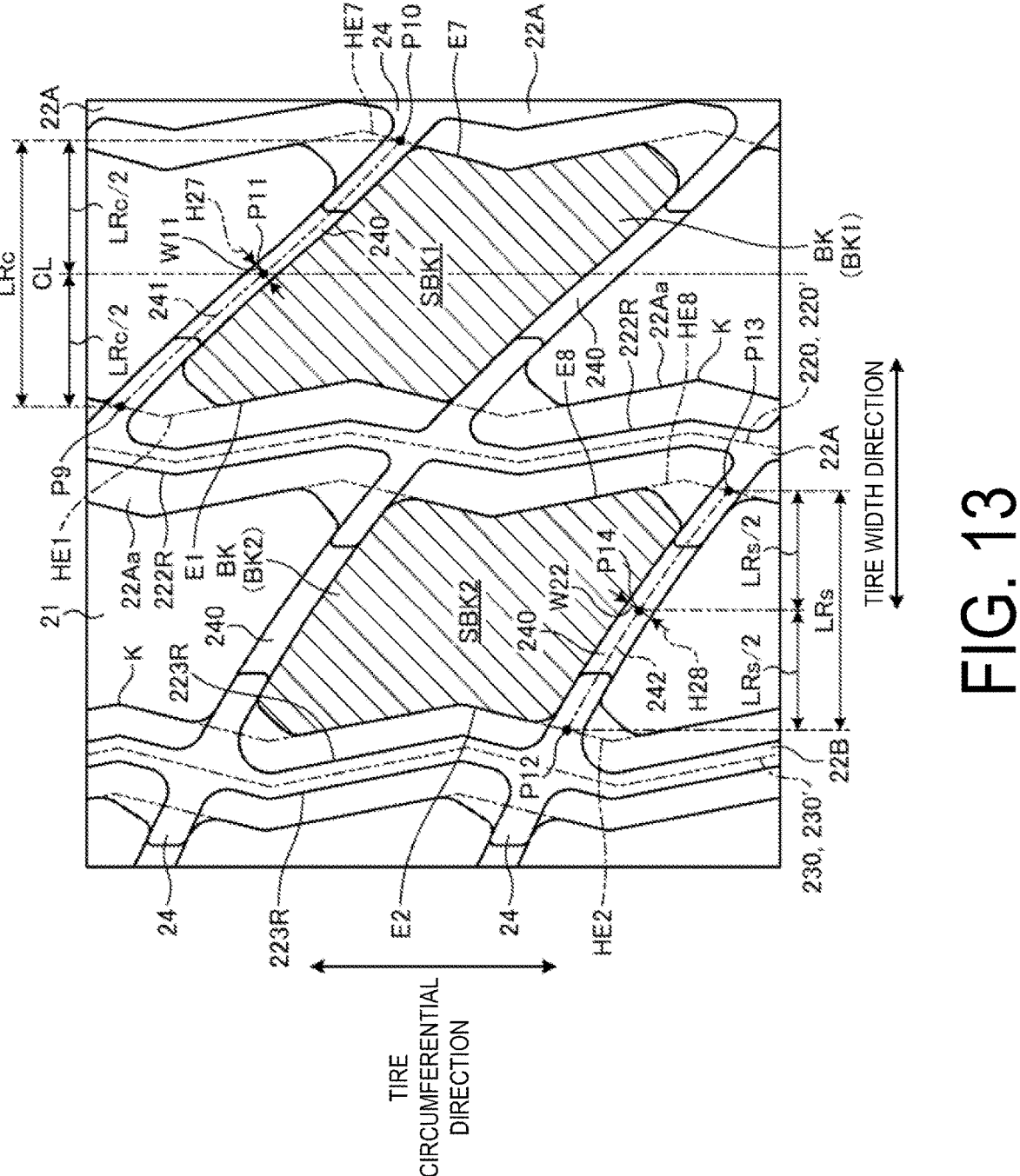
FIG. 13 is an enlarged view of a part of FIG. 2.

FIG. 13 is an enlarged view of a part of FIG. 2. FIG. 13 is an enlarged view of a part A in FIG. 2. In FIG. 13, the area of the road contact surface of the block BK1 is denoted by SBK1, and the area of the road contact surface of the block BK2 is denoted by SBK2. At this time, a ratio SBK2/SBK1 of the area SBK2 to the area SBK1 is preferably 0.87 or more and 0.97 or less.

By configuring the area of the road contact surface of the block BK1 that is closer to the tire equatorial plane CL to be greater than the area of the road contact surface of the block BK2 that is farther from the tire equatorial plane CL, block rigidity can be increased and the amount of deformation is reduced so that rolling resistance performance can be improved. When the ratio SBK2/SBK1 is less than 0.87, the area on the outer side in the tire width direction is small, and block rigidity is non-uniform, and thus rolling resistance performance is degraded, which is not preferable. When the ratio SBK2/SBK1 is greater than 0.97, the ground contact surface pressure decreases and thus rolling resistance performance is degraded, which is not preferable.

In FIG. 13, the midpoint of the distance LRc in the tire width direction between the intersection points P9 and P10 of the two imaginary lines HE1 and HE7 obtained by extending each of the edges E1 and E7 of the block BK1 defined by the main grooves 22A and 22A that are adjacent to each other in the tire width direction and the groove center line 241 of the lug groove 24 is denoted by P11. The groove width of the lug groove 24 along the imaginary line H27 that passes through the midpoint P11 and is orthogonal to the groove center line 241 is denoted by W11. The midpoint of the distance LRs in the tire width direction between the intersection points P12 and P13 of the two imaginary lines HE2 and HE8 obtained by extending each of the edges E2 and E8 of the block BK2 defined by the main grooves 22A and 22B that are adjacent to each other in the tire width direction and the groove center line 242 of the lug groove 24 is denoted by P14. The groove width of the lug groove 24 along the imaginary line H28 that passes through the midpoint P14 and is orthogonal to the groove center line 242 is denoted by W22. At this time, the groove width W11 is less than the groove width W22. Additionally, the ratio W22/W11 of the groove width W22 to the groove width W11 is preferably 1.05 or more and 1.50 or less. By configuring the groove width W22 of the lug groove on the outer side in the tire width direction to be greater than the groove width W11 of the lug groove on the inner side in the tire width direction, snow traction performance can be improved.

Groove Depth of Main Groove and Lug Groove

Each of the raised bottom portions 240 is provided in a region including the midpoints P11 and P14 of each of the lug grooves 24. In the present example, the groove depth of each of the lug grooves 24 is equal to the groove depth of the main grooves 22A and 22B. However, in each of the lug grooves 24, the groove depth of the portion where each of the raised bottom portions 240 is provided is shallower than the groove depth of the main grooves 22A and 22B. Note that the maximum value of the groove depth DR of the main groove 22A is 19.1 mm, for example.

Figure 14:
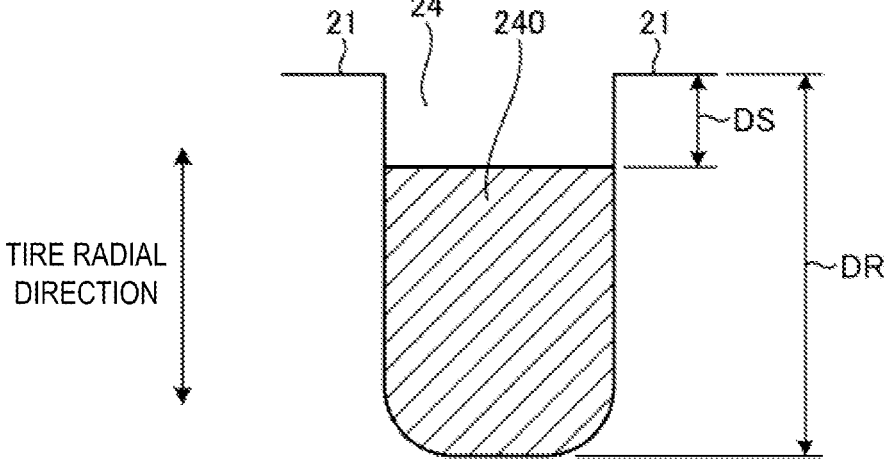
FIG. 14 is a view illustrating a relationship of a groove depth between a lug groove and a raised bottom portion.
Figure 15:
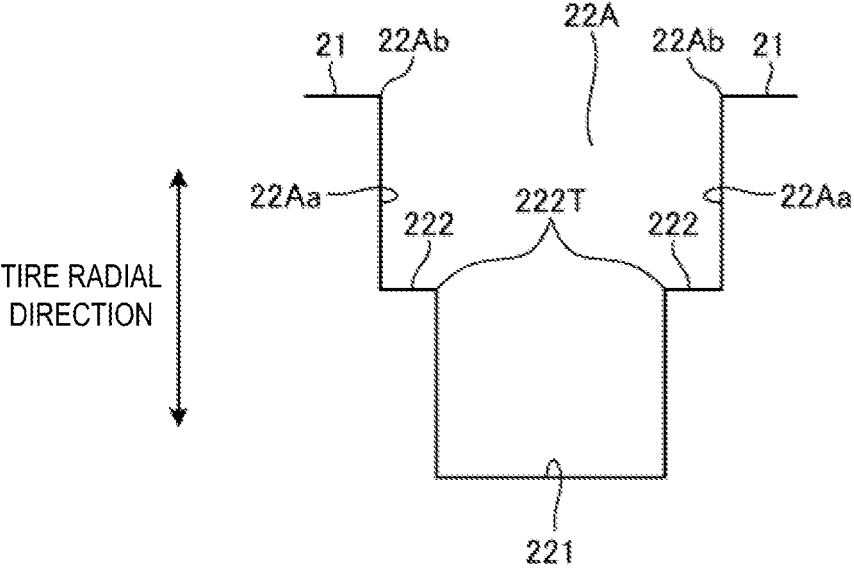
FIG. 15 is a view illustrating a modified example of a cross-sectional shape of a main groove.
Figure 16:
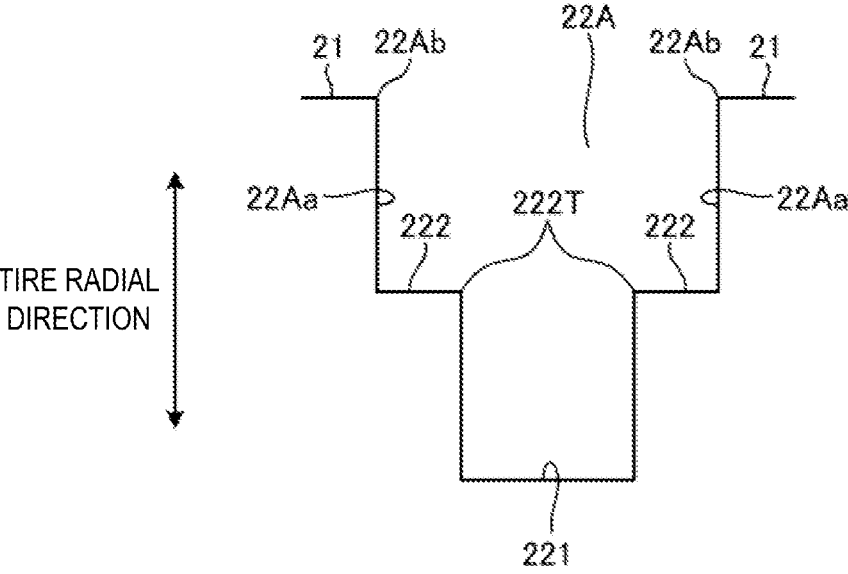
FIG. 16 is a view illustrating a modified example of a cross-sectional shape of a main groove.

FIG. 14 is a view illustrating the relationship of groove depth between the lug groove 24 and the raised bottom portion 240. As illustrated by hatching in FIG. 14, by providing the raised bottom portion 240 that raises the groove bottom, the groove depth of the lug groove 24 is shallower than other portions. In other words, the groove depth DS of the portion of the raised bottom portion 240 is small with respect to the portion where the raised bottom portion 240 of the lug groove 24 is not provided, in other words, with respect to the original groove depth.

Here, the groove depth of the main grooves 22A and 22B is denoted by DR. The ratio DS/DR of the groove depth DS to the groove depth DR is preferably 0.15 or more and 0.35 or less. When the ratio DS/DR is less than 0.15, the lug groove 24 is shallower and snow traction performance is degraded, which is not preferable. When the ratio DS/DR is greater than 0.35, the lug groove 24 is deep, block rigidity is reduced and thus rolling resistance is degraded, which is not preferable.

In a case where the original groove depth of the lug grooves 24 is equal to the groove depth DR of the main grooves 22A and 22B, the ratio of the groove depth DS to the original groove depth of the lug groove 24 is preferably 0.15 or more and 0.35 or less.

Modified Examples

Figure 17:
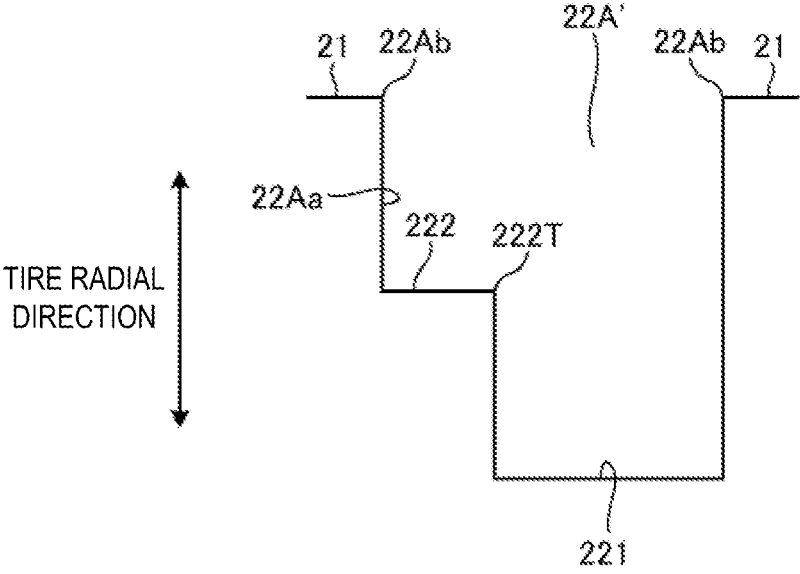
FIG. 17 is a view illustrating a modified example of a cross-sectional shape of a main groove.
Figure 18:
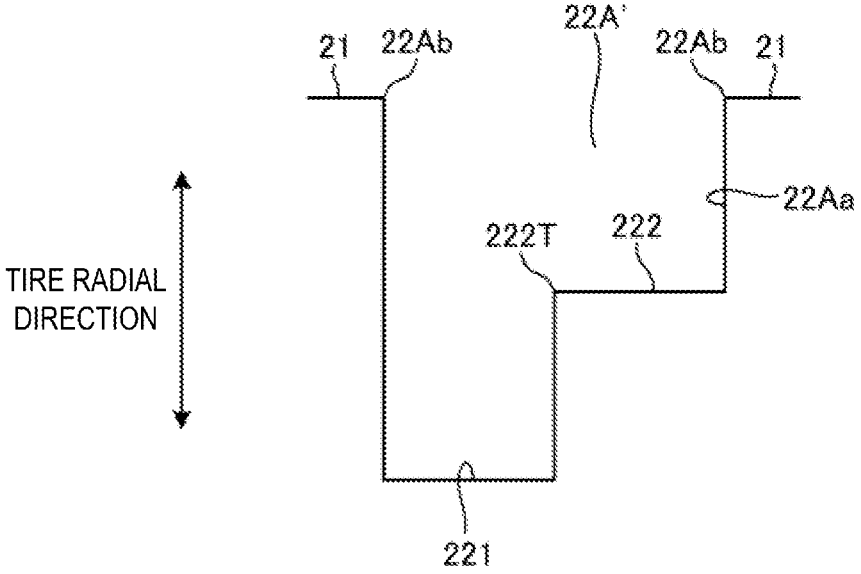
FIG. 18 is a view illustrating a modified example of a cross-sectional shape of a main groove.
Figure 19:
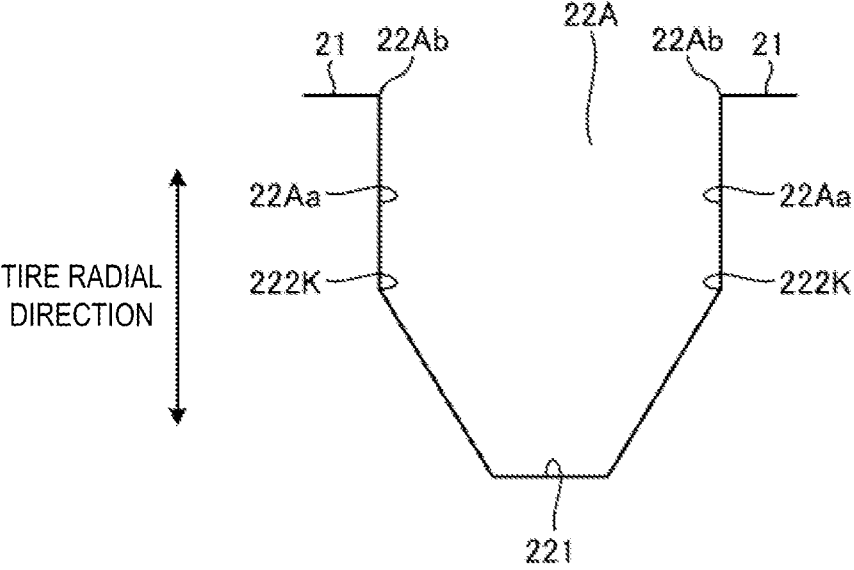
FIG. 19 is a view illustrating a modified example of a cross-sectional shape of a main groove.
Figure 20:
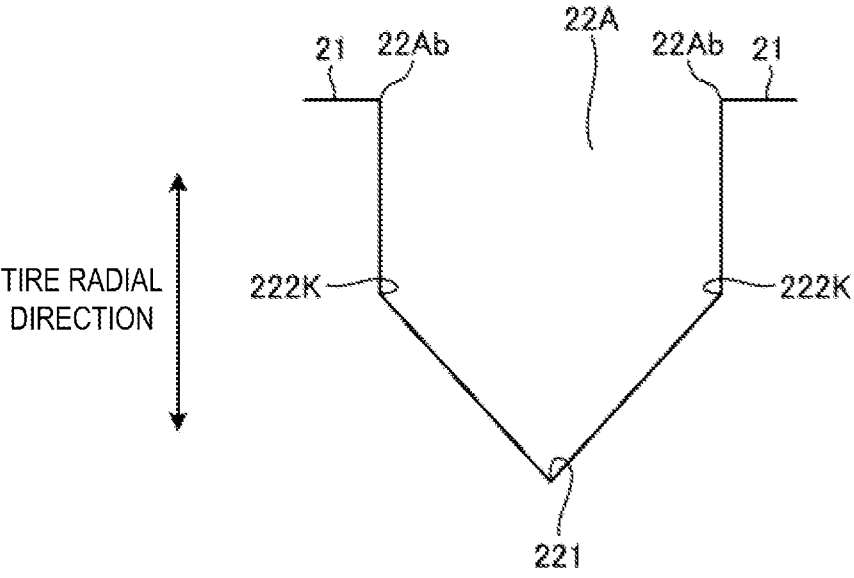
FIG. 20 is a view illustrating a modified example of a cross-sectional shape of a main groove.
Figure 21:
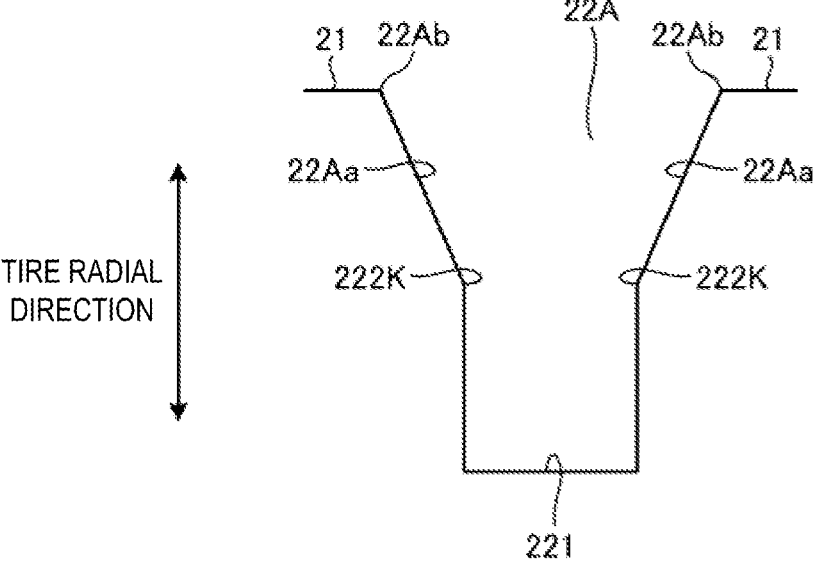
FIG. 21 is a view illustrating a modified example of a cross-sectional shape of a main groove.
Figure 22:
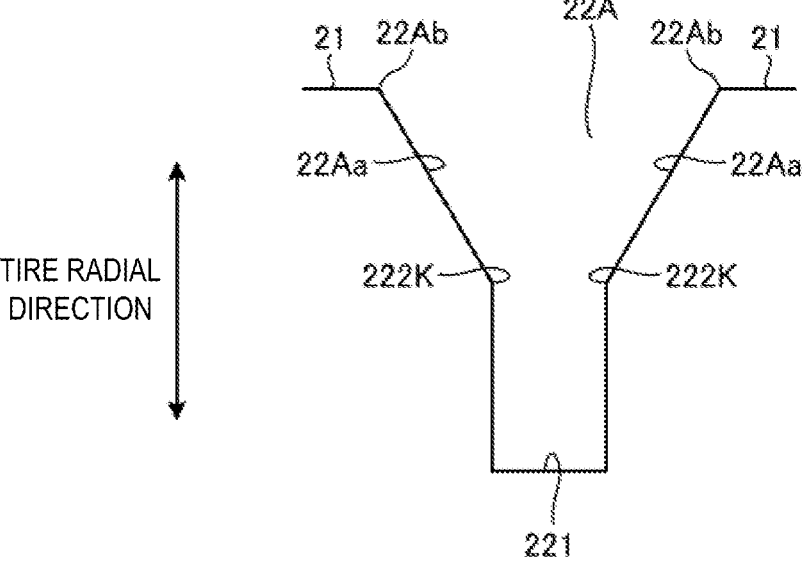
FIG. 22 is a view illustrating a modified example of a cross-sectional shape of a main groove.

FIGS. 15 to 24 are views illustrating modified examples of cross-sectional shapes of the main groove 22A. FIGS. 15 to 18 illustrate examples in which the step portion 222 is provided on the groove wall. In the examples illustrated in FIGS. 15 and 16, the step portions 222 are provided on the groove walls on both sides of the main groove 22A. In the example of FIGS. 17 and 18, the step portion 222 is provided on the groove wall on one side of the main groove 22A'. As described with reference to FIGS. 3, 4, and the like, the end portion 222T of the step 222 is seen as the ridge line 222R.

Figure 23:
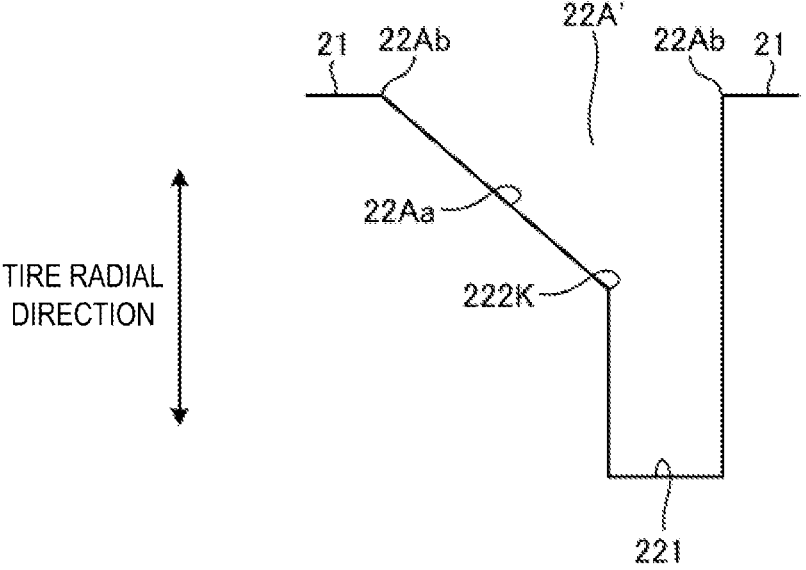
FIG. 23 is a view illustrating a modified example of a cross-sectional shape of a main groove.
Figure 24:
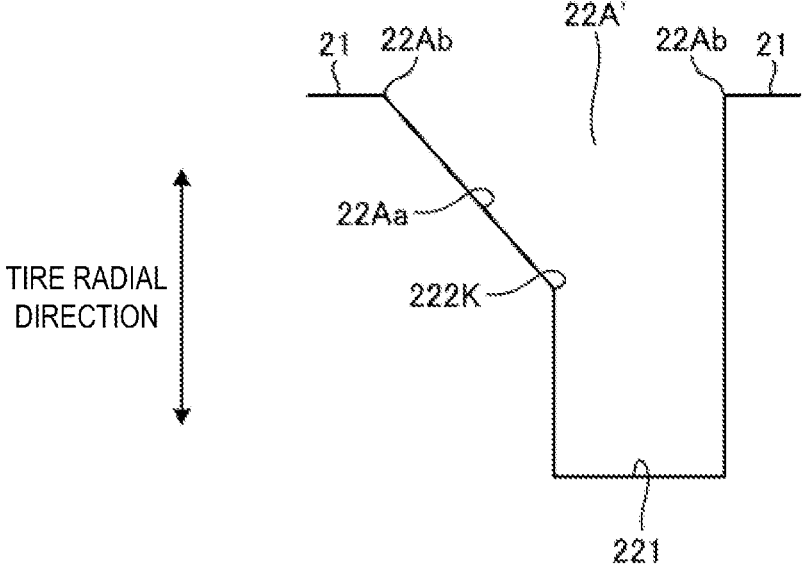
FIG. 24 is a view illustrating a modified example of a cross-sectional shape of a main groove.

As illustrated in FIGS. 19 to 24, the main groove 22A may include, in a meridian cross-section, the bend point 222K instead of the step portion. In the examples illustrated in FIGS. 19 to 22, the bend points 222K are provided on the groove walls on both sides of the main groove 22A. In the example of FIGS. 23 and 24, the bend point 222K is provided on the groove wall on one side of the main groove 22A'. As described with reference to FIGS. 3 and 4, and the like, the bend point 222K is seen as the ridge line 222R.

As described with reference to FIGS. 15 to 24, there may be the bend points on the groove walls on both sides in the extension direction of the main groove 22A, or there may be the bend point on only one of the groove walls on both sides. In other words, the bend point may be provided on at least one of the groove walls on both sides in the extension direction of the main groove 22A. In a case where the bend point is provided on at least one of the groove walls on both sides of the main groove 22A, rolling resistance performance and snow traction performance can be improved. Note that in a case where the bend point is provided on only one of the groove walls on both sides, the bend point is preferably provided on the groove wall on the inner side in the tire width direction.

Although the cross-sectional shapes of the main groove 22A have been described above with reference to FIGS. 15 to 24, identical modifications can be adopted for the cross-sectional shapes of the main groove 22B.

In the embodiments described above, pneumatic tires were described as examples of the tire. However, the configuration is not limited thereto, and the configurations described in the embodiments can be arbitrarily applied to other tires as well within the scope apparent to those skilled in the art. Examples of other tires include airless tires, solid tires, and the like.

EXAMPLES

In the examples, performance tests for rolling resistance performance and snow traction performance were performed on a plurality of types of tires of different conditions (see Tables 1 to 8). In the performance tests, tires with a size of 455/55R22.5 (heavy duty tires) were mounted on 22.5 inch×14.00 inch rims, inflated to the standard maximum air pressure (900 kPa), and mounted on the drive shaft of the test vehicle (2-D tractor head), and the actual vehicle evaluation was performed in a state where a standard maximum load was applied.

For evaluation of rolling resistance performance, the results of the rolling resistance test were expressed in the index value, according to ISO (International Organization for Standardization) 28580. Results are expressed as index values, with the result of Conventional Example being assigned as a reference (100). Larger index values indicate superior rolling resistance performance.

For evaluation of snow traction performance, the test vehicle was driven on a snowy road surface of a snowy road test site and the acceleration time until the travel speed reached 20 km/h from 5 km/h was measured. The measurement results are expressed as index values and evaluated with the Conventional Example being assigned as the reference (100). Larger index values indicate superior snow traction performance.

Each of the tires of Examples 1 to 61 in Tables 1 to 8 has a bend point on the groove wall of the main groove, and the relationship of the angle differences between both end portions of the edges E1 and E2 of the first block BK1 on the inner side and the second block BK2 on the outer side is $(\theta d - \theta c) < (\theta b - \theta a)$, in other words, the angle difference of the first block BK1 on the inner side is larger than the angle difference of the second block BK2 on the outer side.

In the tires of Examples 1 to 61, both groove wall angles of the main groove 22A at the point P56, in other words, both groove wall angles at the midpoint of the edge E1 of the block BK1 on the inner side are equal to each other and different from each other, both groove wall angles of the main groove 22B at the point P78, in other words, both groove wall angles at the midpoint of the edge E2 of the block BK2 on the outer side are equal to each other and different from each other, the ratio of the maximum distance between the wall surfaces of the main groove 22B at the two points P7 and P8 with respect to the maximum distance between the wall surfaces of the main groove 22A at the two points P5 and P6 is 0.75 or more and 0.95 or less and otherwise, the ratio of the distance between the ridge lines 232R at the two points P7 and P8 with respect to the distance between the ridge lines 222R at the two points P5 and P6 is 0.95 or more and 1.05 or less and otherwise, the ratio of the length of the block BK2 on the outer side along the tire circumferential direction with respect to the length of each of the blocks BK1 on the inner side along the tire circumferential direction is 0.75 or more and 0.95 or less and otherwise, the ratio of the length of the linear portion LC of the zigzag with respect to the one pitch length of the zigzag of the center line of the main groove 22A is 0.45 or more and 0.55 or less and otherwise, the ratio of a length Ls1 of the long portion with respect to the one pitch length of the zigzag of the center line of the main groove 22B is 0.50 or more and 0.60 or less and otherwise, the ratio of the amplitude of the center line of the zigzag shape of the edge portion of the tread contact surface along the main groove 22A with respect to the developed tread width TDW is 0.005 or more and 0.020 or less and otherwise, the ratio of the amplitude of the center line of the zigzag shape of the edge portion of the tread contact surface along the main groove 22B with respect to the developed tread width TDW is 0.005 or more and 0.020 or less and otherwise, the ratio of the amplitude of the center line of the zigzag shape of the ridge line of the main groove 22A with respect to the developed tread width TDW is 0.005 or more and 0.030 or less and otherwise, the ratio of the amplitude of the center line of the zigzag shape of the ridge line of the main groove 22B with respect to the developed tread width TDW is 0.005 or more and 0.030 or less and otherwise, the ratio of the area of the road contact surface of the block BK2 with respect to the area of the road contact surface of the block BK1 is 0.87 or more and 0.97 or less and otherwise, the ratio of the lug groove widths at both ends of the edge E2 of the block BK2 with respect to the lug groove widths at both ends of the edge E1 of the block BK1 is 1.05 or more and 1.50 or less and otherwise, the ratio of the groove depth of the lug groove 24 at the portion where the raised bottom portion 240 is provided with respect to the groove depth of the main grooves 22A and 22B is 0.15 or more and 0.35 or less and otherwise, both ends of the edge E1 of the block BK1 include the chamfer and otherwise, and both ends of the edge E2 of the block BK2 include the chamfer and otherwise.

The tire of the Conventional Example in Table 1 has a bend point on the groove wall of the main groove, and the relationship of the angle differences between both end portions of each of the edges of the first block on the inner side and the second block on the outer side is ($\theta$d−$\theta$c)=($\theta$b−$\theta$a), in other words, the angle difference between the second block BK2 on the outer side and the angle difference between the first block BK1 on the inner side are equal, and both groove wall angles at the midpoint of the edge of the block on the inner side are equal, and both groove wall angles at the midpoint of the edge of the block on the outer side are equal.

As described in the test results in Tables 1 to 8, it can be understood that the tires of each of Examples have better rolling resistance performance and snow traction performance.

TABLE 1

|  | Conventional Example | Example 1 | Example 2 |
|---|---|---|---|
| Bend point of groove wall of main groove | No | Yes | Yes |
| Relationship of angle differences between both end portions of inner block edge and outer block edge | Equal | Inner is larger | Inner is larger |
| Both groove wall angles at midpoint of edge of inner block | Equal | Equal | Different |
| Both groove wall angles at midpoint of edge of outer block | Equal | Different | Equal |
| Distance between groove walls of outer main groove/distance between groove walls of inner main groove | 0.50 | 0.70 | 0.70 |
| Distance between ridge lines of outer main groove/distance between ridge lines of inner main groove | 0.50 | 0.90 | 0.90 |
| Outer block length/inner block length | 0.70 | 0.70 | 0.70 |
| Length of linear portion of zigzag of inner main groove center line/one pitch length of zigzag | 0.40 | 0.40 | 0.40 |
| Length of long portion of outer main groove center line/one pitch length of zigzag | 0.30 | 0.30 | 0.30 |
| Amplitude of zigzag center line of road contact surface edge portion of inner main groove/developed tread width | 0.003 | 0.003 | 0.003 |
| Amplitude of zigzag center line of road contact surface edge portion of outer main groove/developed tread width | 0.003 | 0.003 | 0.003 |
| Amplitude of zigzag center line of inner main groove ridge line/developed tread width | 0.003 | 0.003 | 0.003 |
| Amplitude of zigzag center line of outer main groove ridge line/developed tread width | 0.003 | 0.003 | 0.003 |
| Block area ratio of tread contact surface | 0.85 | 0.85 | 0.85 |
| Outer lug groove width/inner lug groove width | 1.00 | 1.00 | 1.00 |

TABLE 1-continued

| | | | |
|---|---|---|---|
| Groove depth of lug groove raised bottom portion/main groove depth | 0.10 | 0.10 | 0.10 |
| Chamfer of both ends of edge of inner block | No | No | No |
| Chamfer of both ends of edge of outer block | No | No | No |
| Rolling resistance performance | 100 | 102 | 102 |
| Snow traction performance | 100 | 100 | 100 |

| | Example 3 | Example 4 | Example 5 | Example 6 |
|---|---|---|---|---|
| Bend point of groove wall of main groove | Yes | Yes | Yes | Yes |
| Relationship of angle differences between both end portions of inner block edge and outer block edge | Inner is larger | Inner is larger | Inner is larger | Inner is larger |
| Both groove wall angles at midpoint of edge of inner block | Equal | Equal | Equal | Equal |
| Both groove wall angles at midpoint of edge of outer block | Equal | Equal | Equal | Equal |
| Distance between groove walls of outer main groove/distance between groove walls of inner main groove | 0.75 | 0.70 | 0.85 | 1.00 |
| Distance between ridge lines of outer main groove/distance between ridge lines of inner main groove | 0.95 | 0.90 | 0.90 | 0.90 |
| Outer block length/inner block length | 0.70 | 0.70 | 0.70 | 0.70 |
| Length of linear portion of zigzag of inner main groove center line/one pitch length of zigzag | 0.40 | 0.40 | 0.40 | 0.40 |
| Length of long portion of outer main groove center line/one pitch length of zigzag | 0.30 | 0.30 | 0.30 | 0.30 |
| Amplitude of zigzag center line of road contact surface edge portion of inner main groove/developed tread width | 0.003 | 0.003 | 0.003 | 0.003 |
| Amplitude of zigzag center line of road contact surface edge portion of outer main groove/developed tread width | 0.003 | 0.003 | 0.003 | 0.003 |
| Amplitude of zigzag center line of inner main groove ridge line/developed tread width | 0.003 | 0.003 | 0.003 | 0.003 |
| Amplitude of zigzag center line of outer main groove ridge line/developed tread width | 0.003 | 0.003 | 0.003 | 0.003 |
| Block area ratio of tread contact surface | 0.85 | 0.85 | 0.85 | 0.85 |
| Outer lug groove width/inner lug groove width | 1.00 | 1.00 | 1.00 | 1.00 |
| Groove depth of lug groove raised bottom portion/main groove depth | 0.10 | 0.10 | 0.10 | 0.10 |
| Chamfer of both ends of edge of inner block | No | No | No | No |
| Chamfer of both ends of edge of outer block | No | No | No | No |
| Rolling resistance performance | 104 | 104 | 104 | 104 |
| Snow traction performance | 100 | 101 | 102 | 102 |

TABLE 2

| | Example 7 | Example 8 | Example 9 | Example 10 |
|---|---|---|---|---|
| Bend point of groove wall of main groove | Yes | Yes | Yes | Yes |
| Relationship of angle differences between both end portions of inner block edge and outer block edge | Inner is larger | Inner is larger | Inner is larger | Inner is larger |
| Both groove wall angles at midpoint of edge of inner block | Equal | Equal | Equal | Equal |
| Both groove wall angles at midpoint of edge of outer block | Equal | Equal | Equal | Equal |
| Distance between groove walls of outer main groove/distance between groove walls of inner main groove | 0.95 | 0.70 | 0.85 | 1.00 |
| Distance between ridge lines of outer main groove/distance between ridge lines of inner main groove | 1.05 | 1.00 | 1.00 | 1.00 |

TABLE 2-continued

| Outer block length/inner block length | 0.70 | 0.70 | 0.70 | 0.70 |
| Length of linear portion of zigzag of inner main groove center line/one pitch length of zigzag | 0.40 | 0.40 | 0.40 | 0.40 |
| Length of long portion of outer main groove center line/one pitch length of zigzag | 0.30 | 0.30 | 0.30 | 0.30 |
| Amplitude of zigzag center line of road contact surface edge portion of inner main groove/developed tread width | 0.003 | 0.003 | 0.003 | 0.003 |
| Amplitude of zigzag center line of road contact surface edge portion of outer main groove/developed tread width | 0.003 | 0.003 | 0.003 | 0.003 |
| Amplitude of zigzag center line of inner main groove ridge line/developed tread width | 0.003 | 0.003 | 0.003 | 0.003 |
| Amplitude of zigzag center line of outer main groove ridge line/developed tread width | 0.003 | 0.003 | 0.003 | 0.003 |
| Block area ratio of tread contact surface | 0.85 | 0.85 | 0.85 | 0.85 |
| Outer lug groove width/inner lug groove width | 1.00 | 1.00 | 1.00 | 1.00 |
| Groove depth of lug groove raised bottom portion/main groove depth | 0.10 | 0.10 | 0.10 | 0.10 |
| Chamfer of both ends of edge of inner block | No | No | No | No |
| Chamfer of both ends of edge of outer block | No | No | No | No |
| Rolling resistance performance | 104 | 104 | 104 | 104 |
| Snow traction performance | 101 | 101 | 101 | 104 |

| | Example 11 | Example 12 | Example 13 | Example 14 |
| --- | --- | --- | --- | --- |
| Bend point of groove wall of main groove | Yes | Yes | Yes | Yes |
| Relationship of angle differences between both end portions of inner block edge and outer block edge | Inner is larger | Inner is larger | Inner is larger | Inner is larger |
| Both groove wall angles at midpoint of edge of inner block | Equal | Equal | Equal | Equal |
| Both groove wall angles at midpoint of edge of outer block | Equal | Equal | Equal | Equal |
| Distance between groove walls of outer main groove/distance between groove walls of inner main groove | 0.70 | 0.85 | 1.00 | 0.85 |
| Distance between ridge lines of outer main groove/distance between ridge lines of inner main groove | 1.10 | 1.10 | 1.10 | 1.00 |
| Outer block length/inner block length | 0.70 | 0.70 | 0.70 | 0.70 |
| Length of linear portion of zigzag of inner main groove center line/one pitch length of zigzag | 0.40 | 0.40 | 0.40 | 0.40 |
| Length of long portion of outer main groove center line/one pitch length of zigzag | 0.30 | 0.30 | 0.30 | 0.30 |
| Amplitude of zigzag center line of road contact surface edge portion of inner main groove/developed tread width | 0.003 | 0.003 | 0.003 | 0.003 |
| Amplitude of zigzag center line of road contact surface edge portion of outer main groove/developed tread width | 0.003 | 0.003 | 0.003 | 0.003 |
| Amplitude of zigzag center line of inner main groove ridge line/developed tread width | 0.003 | 0.003 | 0.003 | 0.003 |
| Amplitude of zigzag center line of outer main groove ridge line/developed tread width | 0.003 | 0.003 | 0.003 | 0.003 |
| Block area ratio of tread contact surface | 0.85 | 0.85 | 0.85 | 0.85 |
| Outer lug groove width/inner lug groove width | 1.00 | 1.00 | 1.00 | 1.00 |
| Groove depth of lug groove raised bottom portion/main groove depth | 0.10 | 0.10 | 0.10 | 0.10 |
| Chamfer of both ends of edge of inner block | No | No | No | No |
| Chamfer of both ends of edge of outer block | No | No | No | No |
| Rolling resistance performance | 104 | 104 | 104 | 103 |
| Snow traction performance | 102 | 101 | 102 | 104 |

TABLE 3

| | Example 15 | Example 16 | Example 17 | Example 18 |
|---|---|---|---|---|
| Bend point of groove wall of main groove | Yes | Yes | Yes | Yes |
| Relationship of angle differences between both end portions of inner block edge and outer block edge | Inner is larger | Inner is larger | Inner is larger | Inner is larger |
| Both groove wall angles at midpoint of edge of inner block | Equal | Equal | Equal | Equal |
| Both groove wall angles at midpoint of edge of outer block | Equal | Equal | Equal | Equal |
| Distance between groove walls of outer main groove/distance between groove walls of inner main groove | 0.85 | 0.85 | 0.85 | 0.85 |
| Distance between ridge lines of outer main groove/distance between ridge lines of inner main groove | 1.00 | 1.00 | 1.00 | 1.00 |
| Outer block length/inner block length | 0.75 | 0.85 | 0.95 | 1.00 |
| Length of linear portion of zigzag of inner main groove center line/one pitch length of zigzag | 0.40 | 0.40 | 0.40 | 0.40 |
| Length of long portion of outer main groove center line/one pitch length of zigzag | 0.30 | 0.30 | 0.30 | 0.30 |
| Amplitude of zigzag center line of road contact surface edge portion of inner main groove/developed tread width | 0.003 | 0.003 | 0.003 | 0.003 |
| Amplitude of zigzag center line of road contact surface edge portion of outer main groove/developed tread width | 0.003 | 0.003 | 0.003 | 0.003 |
| Amplitude of zigzag center line of inner main groove ridge line/developed tread width | 0.003 | 0.003 | 0.003 | 0.003 |
| Amplitude of zigzag center line of outer main groove ridge line/developed tread width | 0.003 | 0.003 | 0.003 | 0.003 |
| Block area ratio of tread contact surface | 0.85 | 0.85 | 0.85 | 0.85 |
| Outer lug groove width/inner lug groove width | 1.00 | 1.00 | 1.00 | 1.00 |
| Groove depth of lug groove raised bottom portion/main groove depth | 0.10 | 0.10 | 0.10 | 0.10 |
| Chamfer of both ends of edge of inner block | No | No | No | No |
| Chamfer of both ends of edge of outer block | No | No | No | No |
| Rolling resistance performance | 104 | 106 | 104 | 104 |
| Snow traction performance | 104 | 106 | 104 | 103 |

| | Example 19 | Example 20 | Example 21 | Example 22 |
|---|---|---|---|---|
| Bend point of groove wall of main groove | Yes | Yes | Yes | Yes |
| Relationship of angle differences between both end portions of inner block edge and outer block edge | Inner is larger | Inner is larger | Inner is larger | Inner is larger |
| Both groove wall angles at midpoint of edge of inner block | Equal | Equal | Equal | Equal |
| Both groove wall angles at midpoint of edge of outer block | Equal | Equal | Equal | Equal |
| Distance between groove walls of outer main groove/distance between groove walls of inner main groove | 0.85 | 0.85 | 0.85 | 0.85 |
| Distance between ridge lines of outer main groove/distance between ridge lines of inner main groove | 1.00 | 1.00 | 1.00 | 1.00 |
| Outer block length/inner block length | 0.85 | 0.85 | 0.85 | 0.85 |
| Length of linear portion of zigzag of inner main groove center line/one pitch length of zigzag | 0.45 | 0.50 | 0.55 | 0.60 |
| Length of long portion of outer main groove center line/one pitch length of zigzag | 0.30 | 0.30 | 0.30 | 0.30 |
| Amplitude of zigzag center line of road contact surface edge portion of inner main groove/developed tread width | 0.003 | 0.003 | 0.003 | 0.003 |
| Amplitude of zigzag center line of road contact surface edge portion of outer main groove/developed tread width | 0.003 | 0.003 | 0.003 | 0.003 |

TABLE 3-continued

| | | | | |
|---|---|---|---|---|
| Amplitude of zigzag center line of inner main groove ridge line/developed tread width | 0.003 | 0.003 | 0.003 | 0.003 |
| Amplitude of zigzag center line of outer main groove ridge line/developed tread width | 0.003 | 0.003 | 0.003 | 0.003 |
| Block area ratio of tread contact surface | 0.85 | 0.85 | 0.85 | 0.85 |
| Outer lug groove width/inner lug groove width | 1.00 | 1.00 | 1.00 | 1.00 |
| Groove depth of lug groove raised bottom portion/main groove depth | 0.10 | 0.10 | 0.10 | 0.10 |
| Chamfer of both ends of edge of inner block | No | No | No | No |
| Chamfer of both ends of edge of outer block | No | No | No | No |
| Rolling resistance performance | 104 | 105 | 104 | 105 |
| Snow traction performance | 104 | 106 | 104 | 106 |

TABLE 4

| | Example 23 | Example 24 | Example 25 | Example 26 |
|---|---|---|---|---|
| Bend point of groove wall of main groove | Yes | Yes | Yes | Yes |
| Relationship of angle differences between both end portions of inner block edge and outer block edge | Inner is larger | Inner is larger | Inner is larger | Inner is larger |
| Both groove wall angles at midpoint of edge of inner block | Equal | Equal | Equal | Equal |
| Both groove wall angles at midpoint of edge of outer block | Equal | Equal | Equal | Equal |
| Distance between groove walls of outer main groove/distance between groove walls of inner main groove | 0.85 | 0.85 | 0.85 | 0.85 |
| Distance between ridge lines of outer main groove/distance between ridge lines of inner main groove | 1.00 | 1.00 | 1.00 | 1.00 |
| Outer block length/inner block length | 0.85 | 0.85 | 0.85 | 0.85 |
| Length of linear portion of zigzag of inner main groove center line/one pitch length of zigzag | 0.70 | 0.50 | 0.60 | 0.70 |
| Length of long portion of outer main groove center line/one pitch length of zigzag | 0.30 | 0.50 | 0.50 | 0.50 |
| Amplitude of zigzag center line of road contact surface edge portion of inner main groove/developed tread width | 0.003 | 0.003 | 0.003 | 0.003 |
| Amplitude of zigzag center line of road contact surface edge portion of outer main groove/developed tread width | 0.003 | 0.003 | 0.003 | 0.003 |
| Amplitude of zigzag center line of inner main groove ridge line/developed tread width | 0.003 | 0.003 | 0.003 | 0.003 |
| Amplitude of zigzag center line of outer main groove ridge line/developed tread width | 0.003 | 0.003 | 0.003 | 0.003 |
| Block area ratio of tread contact surface | 0.85 | 0.85 | 0.85 | 0.85 |
| Outer lug groove width/inner lug groove width | 1.00 | 1.00 | 1.00 | 1.00 |
| Groove depth of lug groove raised bottom portion/main groove depth | 0.10 | 0.10 | 0.10 | 0.10 |
| Chamfer of both ends of edge of inner block | No | No | No | No |
| Chamfer of both ends of edge of outer block | No | No | No | No |
| Rolling resistance performance | 105 | 106 | 109 | 106 |
| Snow traction performance | 106 | 106 | 106 | 106 |

| | Example 27 | Example 28 | Example 29 | Example 30 |
|---|---|---|---|---|
| Bend point of groove wall of main groove | Yes | Yes | Yes | Yes |
| Relationship of angle differences between both end portions of inner block edge and outer block edge | Inner is larger | Inner is larger | Inner is larger | Inner is larger |
| Both groove wall angles at midpoint of edge of inner block | Equal | Equal | Equal | Equal |
| Both groove wall angles at midpoint of edge of outer block | Equal | Equal | Equal | Equal |

TABLE 4-continued

| | | | | |
|---|---|---|---|---|
| Distance between groove walls of outer main groove/distance between groove walls of inner main groove | 0.85 | 0.85 | 0.85 | 0.85 |
| Distance between ridge lines of outer main groove/distance between ridge lines of inner main groove | 1.00 | 1.00 | 1.00 | 1.00 |
| Outer block length/inner block length | 0.85 | 0.85 | 0.85 | 0.85 |
| Length of linear portion of zigzag of inner main groove center line/one pitch length of zigzag | 0.50 | 0.50 | 0.50 | 0.60 |
| Length of long portion of outer main groove center line/one pitch length of zigzag | 0.55 | 0.65 | 0.70 | 0.70 |
| Amplitude of zigzag center line of road contact surface edge portion of inner main groove/developed tread width | 0.003 | 0.003 | 0.003 | 0.003 |
| Amplitude of zigzag center line of road contact surface edge portion of outer main groove/developed tread width | 0.003 | 0.003 | 0.003 | 0.003 |
| Amplitude of zigzag center line of inner main groove ridge line/developed tread width | 0.003 | 0.003 | 0.003 | 0.003 |
| Amplitude of zigzag center line of outer main groove ridge line/developed tread width | 0.003 | 0.003 | 0.003 | 0.003 |
| Block area ratio of tread contact surface | 0.85 | 0.85 | 0.85 | 0.85 |
| Outer lug groove width/inner lug groove width | 1.00 | 1.00 | 1.00 | 1.00 |
| Groove depth of lug groove raised bottom portion/main groove depth | 0.10 | 0.10 | 0.10 | 0.10 |
| Chamfer of both ends of edge of inner block | No | No | No | No |
| Chamfer of both ends of edge of outer block | No | No | No | No |
| Rolling resistance performance | 105 | 105 | 105 | 105 |
| Snow traction performance | 106 | 106 | 106 | 106 |

TABLE 5

| | Example 31 | Example 32 | Example 33 | Example 34 |
|---|---|---|---|---|
| Bend point of groove wall of main groove | Yes | Yes | Yes | Yes |
| Relationship of angle differences between both end portions of inner block edge and outer block edge | Inner is larger | Inner is larger | Inner is larger | Inner is larger |
| Both groove wall angles at midpoint of edge of inner block | Equal | Equal | Equal | Equal |
| Both groove wall angles at midpoint of edge of outer block | Equal | Equal | Equal | Equal |
| Distance between groove walls of outer main groove/distance between groove walls of inner main groove | 0.85 | 0.85 | 0.85 | 0.85 |
| Distance between ridge lines of outer main groove/distance between ridge lines of inner main groove | 1.00 | 1.00 | 1.00 | 1.00 |
| Outer block length/inner block length | 0.85 | 0.85 | 0.85 | 0.85 |
| Length of linear portion of zigzag of inner main groove center line/one pitch length of zigzag | 0.50 | 0.50 | 0.50 | 0.50 |
| Length of long portion of outer main groove center line/one pitch length of zigzag | 0.60 | 0.60 | 0.60 | 0.60 |
| Amplitude of zigzag center line of road contact surface edge portion of inner main groove/developed tread width | 0.003 | 0.003 | 0.005 | 0.010 |
| Amplitude of zigzag center line of road contact surface edge portion of outer main groove/developed tread width | 0.003 | 0.003 | 0.005 | 0.010 |
| Amplitude of zigzag center line of inner main groove ridge line/developed tread width | 0.003 | 0.003 | 0.003 | 0.003 |
| Amplitude of zigzag center line of outer main groove ridge line/developed tread width | 0.003 | 0.003 | 0.003 | 0.003 |
| Block area ratio of tread contact surface | 0.85 | 0.85 | 0.85 | 0.85 |
| Outer lug groove width/inner lug groove width | 1.00 | 1.00 | 1.00 | 1.00 |

TABLE 5-continued

|  | | | | |
|---|---|---|---|---|
| Groove depth of lug groove raised bottom portion/main groove depth | 0.10 | 0.10 | 0.10 | 0.10 |
| Chamfer of both ends of edge of inner block | No | No | No | No |
| Chamfer of both ends of edge of outer block | No | No | No | No |
| Rolling resistance performance | 105 | 111 | 111 | 112 |
| Snow traction performance | 106 | 108 | 108 | 109 |

|  | Example 35 | Example 36 | Example 37 | Example 38 |
|---|---|---|---|---|
| Bend point of groove wall of main groove | Yes | Yes | Yes | Yes |
| Relationship of angle differences between both end portions of inner block edge and outer block edge | Inner is larger | Inner is larger | Inner is larger | Inner is larger |
| Both groove wall angles at midpoint of edge of inner block | Equal | Equal | Equal | Equal |
| Both groove wall angles at midpoint of edge of outer block | Equal | Equal | Equal | Equal |
| Distance between groove walls of outer main groove/distance between groove walls of inner main groove | 0.85 | 0.85 | 0.85 | 0.85 |
| Distance between ridge lines of outer main groove/distance between ridge lines of inner main groove | 1.00 | 1.00 | 1.00 | 1.00 |
| Outer block length/inner block length | 0.85 | 0.85 | 0.85 | 0.85 |
| Length of linear portion of zigzag of inner main groove center line/one pitch length of zigzag | 0.50 | 0.50 | 0.50 | 0.50 |
| Length of long portion of outer main groove center line/one pitch length of zigzag | 0.60 | 0.60 | 0.60 | 0.60 |
| Amplitude of zigzag center line of road contact surface edge portion of inner main groove/developed tread width | 0.020 | 0.030 | 0.010 | 0.010 |
| Amplitude of zigzag center line of road contact surface edge portion of outer main groove/developed tread width | 0.020 | 0.030 | 0.010 | 0.010 |
| Amplitude of zigzag center line of inner main groove ridge line/developed tread width | 0.003 | 0.003 | 0.003 | 0.005 |
| Amplitude of zigzag center line of outer main groove ridge line/developed tread width | 0.003 | 0.003 | 0.003 | 0.005 |
| Block area ratio of tread contact surface | 0.85 | 0.85 | 0.85 | 0.85 |
| Outer lug groove width/inner lug groove width | 1.00 | 1.00 | 1.00 | 1.00 |
| Groove depth of lug groove raised bottom portion/main groove depth | 0.10 | 0.10 | 0.10 | 0.10 |
| Chamfer of both ends of edge of inner block | No | No | No | No |
| Chamfer of both ends of edge of outer block | No | No | No | No |
| Rolling resistance performance | 111 | 110 | 113 | 113 |
| Snow traction performance | 108 | 109 | 109 | 109 |

TABLE 6

|  | Example 39 | Example 40 | Example 41 | Example 42 |
|---|---|---|---|---|
| Bend point of groove wall of main groove | Yes | Yes | Yes | Yes |
| Relationship of angle differences between both end portions of inner block edge and outer block edge | Inner is larger | Inner is larger | Inner is larger | Inner is larger |
| Both groove wall angles at midpoint of edge of inner block | Equal | Equal | Equal | Equal |
| Both groove wall angles at midpoint of edge of outer block | Equal | Equal | Equal | Equal |
| Distance between groove walls of outer main groove/distance between groove walls of inner main groove | 0.85 | 0.85 | 0.85 | 0.85 |
| Distance between ridge lines of outer main groove/distance between ridge lines of inner main groove | 1.00 | 1.00 | 1.00 | 1.00 |

TABLE 6-continued

| | | | | |
|---|---|---|---|---|
| Outer block length/inner block length | 0.85 | 0.85 | 0.85 | 0.85 |
| Length of linear portion of zigzag of inner main groove center line/one pitch length of zigzag | 0.50 | 0.50 | 0.50 | 0.50 |
| Length of long portion of outer main groove center line/one pitch length of zigzag | 0.60 | 0.60 | 0.60 | 0.60 |
| Amplitude of zigzag center line of road contact surface edge portion of inner main groove/developed tread width | 0.010 | 0.010 | 0.010 | 0.010 |
| Amplitude of zigzag center line of road contact surface edge portion of outer main groove/developed tread width | 0.010 | 0.010 | 0.010 | 0.010 |
| Amplitude of zigzag center line of inner main groove ridge line/developed tread width | 0.010 | 0.020 | 0.030 | 0.040 |
| Amplitude of zigzag center line of outer main groove ridge line/developed tread width | 0.010 | 0.020 | 0.030 | 0.040 |
| Block area ratio of tread contact surface | 0.85 | 0.85 | 0.85 | 0.85 |
| Outer lug groove width/inner lug groove width | 1.00 | 1.00 | 1.00 | 1.00 |
| Groove depth of lug groove raised bottom portion/main groove depth | 0.10 | 0.10 | 0.10 | 0.10 |
| Chamfer of both ends of edge of inner block | No | No | No | No |
| Chamfer of both ends of edge of outer block | No | No | No | No |
| Rolling resistance performance | 113 | 114 | 113 | 112 |
| Snow traction performance | 109 | 109 | 109 | 109 |

| | Example 43 | Example 44 | Example 45 | Example 46 |
|---|---|---|---|---|
| Bend point of groove wall of main groove | Yes | Yes | Yes | Yes |
| Relationship of angle differences between both end portions of inner block edge and outer block edge | Inner is larger | Inner is larger | Inner is larger | Inner is larger |
| Both groove wall angles at midpoint of edge of inner block | Equal | Equal | Equal | Equal |
| Both groove wall angles at midpoint of edge of outer block | Equal | Equal | Equal | Equal |
| Distance between groove walls of outer main groove/distance between groove walls of inner main groove | 0.85 | 0.85 | 0.85 | 0.85 |
| Distance between ridge lines of outer main groove/distance between ridge lines of inner main groove | 1.00 | 1.00 | 1.00 | 1.00 |
| Outer block length/inner block length | 0.85 | 0.85 | 0.85 | 0.85 |
| Length of linear portion of zigzag of inner main groove center line/one pitch length of zigzag | 0.50 | 0.50 | 0.50 | 0.50 |
| Length of long portion of outer main groove center line/one pitch length of zigzag | 0.60 | 0.60 | 0.60 | 0.60 |
| Amplitude of zigzag center line of road contact surface edge portion of inner main groove/developed tread width | 0.010 | 0.010 | 0.010 | 0.010 |
| Amplitude of zigzag center line of road contact surface edge portion of outer main groove/developed tread width | 0.010 | 0.010 | 0.010 | 0.010 |
| Amplitude of zigzag center line of inner main groove ridge line/developed tread width | 0.020 | 0.020 | 0.020 | 0.020 |
| Amplitude of zigzag center line of outer main groove ridge line/developed tread width | 0.020 | 0.020 | 0.020 | 0.020 |
| Block area ratio of tread contact surface | 0.85 | 0.87 | 0.90 | 0.97 |
| Outer lug groove width/inner lug groove width | 1.00 | 1.00 | 1.00 | 1.00 |
| Groove depth of lug groove raised bottom portion/main groove depth | 0.10 | 0.10 | 0.10 | 0.10 |
| Chamfer of both ends of edge of inner block | No | No | No | No |
| Chamfer of both ends of edge of outer block | No | No | No | No |
| Rolling resistance performance | 115 | 115 | 116 | 115 |
| Snow traction performance | 109 | 109 | 109 | 109 |

TABLE 7

| | Example 47 | Example 48 | Example 49 | Example 50 |
|---|---|---|---|---|
| Bend point of groove wall of main groove | Yes | Yes | Yes | Yes |
| Relationship of angle differences between both end portions of inner block edge and outer block edge | Inner is larger | Inner is larger | Inner is larger | Inner is larger |
| Both groove wall angles at midpoint of edge of inner block | Equal | Equal | Equal | Equal |
| Both groove wall angles at midpoint of edge of outer block | Equal | Equal | Equal | Equal |
| Distance between groove walls of outer main groove/distance between groove walls of inner main groove | 0.85 | 0.85 | 0.85 | 0.85 |
| Distance between ridge lines of outer main groove/distance between ridge lines of inner main groove | 1.00 | 1.00 | 1.00 | 1.00 |
| Outer block length/inner block length | 0.85 | 0.85 | 0.85 | 0.85 |
| Length of linear portion of zigzag of inner main groove center line/one pitch length of zigzag | 0.50 | 0.50 | 0.50 | 0.50 |
| Length of long portion of outer main groove center line/one pitch length of zigzag | 0.60 | 0.60 | 0.60 | 0.60 |
| Amplitude of zigzag center line of road contact surface edge portion of inner main groove/developed tread width | 0.010 | 0.010 | 0.010 | 0.010 |
| Amplitude of zigzag center line of road contact surface edge portion of outer main groove/developed tread width | 0.010 | 0.010 | 0.010 | 0.010 |
| Amplitude of zigzag center line of inner main groove ridge line/developed tread width | 0.020 | 0.020 | 0.020 | 0.020 |
| Amplitude of zigzag center line of outer main groove ridge line/developed tread width | 0.020 | 0.020 | 0.020 | 0.020 |
| Block area ratio of tread contact surface | 1.00 | 0.90 | 0.90 | 0.90 |
| Outer lug groove width/inner lug groove width | 1.00 | 0.50 | 1.00 | 1.05 |
| Groove depth of lug groove raised bottom portion/main groove depth | 0.10 | 0.10 | 0.10 | 0.10 |
| Chamfer of both ends of edge of inner block | No | No | No | No |
| Chamfer of both ends of edge of outer block | No | No | No | No |
| Rolling resistance performance | 115 | 116 | 116 | 116 |
| Snow traction performance | 109 | 110 | 112 | 112 |

| | Example 51 | Example 52 | Example 53 | Example 54 |
|---|---|---|---|---|
| Bend point of groove wall of main groove | Yes | Yes | Yes | Yes |
| Relationship of angle differences between both end portions of inner block edge and outer block edge | Inner is larger | Inner is larger | Inner is larger | Inner is larger |
| Both groove wall angles at midpoint of edge of inner block | Equal | Equal | Equal | Equal |
| Both groove wall angles at midpoint of edge of outer block | Equal | Equal | Equal | Equal |
| Distance between groove walls of outer main groove/distance between groove walls of inner main groove | 0.85 | 0.85 | 0.85 | 0.85 |
| Distance between ridge lines of outer main groove/distance between ridge lines of inner main groove | 1.00 | 1.00 | 1.00 | 1.00 |
| Outer block length/inner block length | 0.85 | 0.85 | 0.85 | 0.85 |
| Length of linear portion of zigzag of inner main groove center line/one pitch length of zigzag | 0.50 | 0.50 | 0.50 | 0.50 |
| Length of long portion of outer main groove center line/one pitch length of zigzag | 0.60 | 0.60 | 0.60 | 0.60 |
| Amplitude of zigzag center line of road contact surface edge portion of inner main groove/developed tread width | 0.010 | 0.010 | 0.010 | 0.010 |
| Amplitude of zigzag center line of road contact surface edge portion of outer main groove/developed tread width | 0.010 | 0.010 | 0.010 | 0.010 |
| Amplitude of zigzag center line of inner main groove ridge line/developed tread width | 0.020 | 0.020 | 0.020 | 0.020 |

TABLE 7-continued

| | | | | |
|---|---|---|---|---|
| Amplitude of zigzag center line of outer main groove ridge line/developed tread width | 0.020 | 0.020 | 0.020 | 0.020 |
| Block area ratio of tread contact surface | 0.90 | 0.90 | 0.90 | 0.90 |
| Outer lug groove width/inner lug groove width | 1.30 | 1.00 | 1.50 | 1.30 |
| Groove depth of lug groove raised bottom portion/main groove depth | 0.10 | 0.10 | 0.10 | 0.15 |
| Chamfer of both ends of edge of inner block | No | No | No | No |
| Chamfer of both ends of edge of outer block | No | No | No | No |
| Rolling resistance performance | 116 | 116 | 116 | 117 |
| Snow traction performance | 114 | 112 | 112 | 115 |

TABLE 8

| | Example 55 | Example 56 | Example 57 | Example 58 |
|---|---|---|---|---|
| Bend point of groove wall of main groove | Yes | Yes | Yes | Yes |
| Relationship of angle differences between both end portions of inner block edge and outer block edge | Inner is larger | Inner is larger | Inner is larger | Inner is larger |
| Both groove wall angles at midpoint of edge of inner block | Equal | Equal | Equal | Equal |
| Both groove wall angles at midpoint of edge of outer block | Equal | Equal | Equal | Equal |
| Distance between groove walls of outer main groove/distance between groove walls of inner main groove | 0.85 | 0.85 | 0.85 | 0.85 |
| Distance between ridge lines of outer main groove/distance between ridge lines of inner main groove | 1.00 | 1.00 | 1.00 | 1.00 |
| Outer block length/inner block length | 0.85 | 0.85 | 0.85 | 0.85 |
| Length of linear portion of zigzag of inner main groove center line/one pitch length of zigzag | 0.50 | 0.50 | 0.50 | 0.50 |
| Length of long portion of outer main groove center line/one pitch length of zigzag | 0.60 | 0.60 | 0.60 | 0.60 |
| Amplitude of zigzag center line of road contact surface edge portion of inner main groove/developed tread width | 0.010 | 0.010 | 0.010 | 0.010 |
| Amplitude of zigzag center line of road contact surface edge portion of outer main groove/developed tread width | 0.010 | 0.010 | 0.010 | 0.010 |
| Amplitude of zigzag center line of inner main groove ridge line/developed tread width | 0.020 | 0.020 | 0.020 | 0.020 |
| Amplitude of zigzag center line of outer main groove ridge line/developed tread width | 0.020 | 0.020 | 0.020 | 0.020 |
| Block area ratio of tread contact surface | 0.90 | 0.90 | 0.90 | 0.90 |
| Outer lug groove width/inner lug groove width | 1.30 | 1.30 | 1.30 | 1.30 |
| Groove depth of lug groove raised bottom portion/main groove depth | 0.25 | 0.35 | 0.40 | 0.25 |
| Chamfer of both ends of edge of inner block | No | No | No | No |
| Chamfer of both ends of edge of outer block | No | No | No | No |
| Rolling resistance performance | 119 | 117 | 117 | 119 |
| Snow traction performance | 115 | 115 | 114 | 115 |

| | Example 59 | Example 60 | Example 61 |
|---|---|---|---|
| Bend point of groove wall of main groove | Yes | Yes | Yes |
| Relationship of angle differences between both end portions of inner block edge and outer block edge | Inner is larger | Inner is larger | Inner is larger |
| Both groove wall angles at midpoint of edge of inner block | Equal | Equal | Equal |
| Both groove wall angles at midpoint of edge of outer block | Equal | Equal | Equal |
| Distance between groove walls of outer main groove/distance between groove walls of inner main groove | 0.85 | 0.85 | 0.85 |

TABLE 8-continued

| | | | |
|---|---|---|---|
| Distance between ridge lines of outer main groove/distance between ridge lines of inner main groove | 1.00 | 1.00 | 1.00 |
| Outer block length/inner block length | 0.85 | 0.85 | 0.85 |
| Length of linear portion of zigzag of inner main groove center line/one pitch length of zigzag | 0.50 | 0.50 | 0.50 |
| Length of long portion of outer main groove center line/one pitch length of zigzag | 0.60 | 0.60 | 0.60 |
| Amplitude of zigzag center line of road contact surface edge portion of inner main groove/developed tread width | 0.010 | 0.010 | 0.010 |
| Amplitude of zigzag center line of road contact surface edge portion of outer main groove/developed tread width | 0.010 | 0.010 | 0.010 |
| Amplitude of zigzag center line of inner main groove ridge line/developed tread width | 0.020 | 0.020 | 0.020 |
| Amplitude of zigzag center line of outer main groove ridge line/developed tread width | 0.020 | 0.020 | 0.020 |
| Block area ratio of tread contact surface | 0.90 | 0.90 | 0.90 |
| Outer lug groove width/inner lug groove width | 1.30 | 1.30 | 1.30 |
| Groove depth of lug groove raised bottom portion/main groove depth | 0.25 | 0.25 | 0.25 |
| Chamfer of both ends of edge of inner block | Yes | No | Yes |
| Chamfer of both ends of edge of outer block | No | Yes | Yes |
| Rolling resistance performance | 121 | 122 | 124 |
| Snow traction performance | 117 | 117 | 117 |

The invention claimed is:

1. A tire, comprising: a plurality of main grooves extending in a tire circumferential direction; a land portion defined by the main grooves; a plurality of lug grooves extending through the land portion; and a plurality of blocks defined by the plurality of main grooves and the plurality of lug grooves, the main grooves comprising, in a meridian cross-section, a bend point where an angle of a groove wall with respect to a normal line of a tread surface changes, the bend point not including a transition from a groove bottom of the main grooves to the groove wall of the main grooves and the bend point being provided radially outward of the groove bottom of the main grooves, the plurality of blocks comprising a first block and a second block, where among a first main groove and a second main groove having distances differing from each other in a tire width direction from a tire equatorial plane, the first block has a first edge along the first main groove where a distance in the tire width direction is closer to the tire equatorial plane and the second block has a second edge along the second main groove where a distance in the tire width direction is farther from the tire equatorial plane, two angles between an imaginary line obtained by extending a ridge line formed by the bend point of a groove wall on the first edge side of the first main groove and imaginary lines each obtained by extending two edges that are adjacent to each other in the tire circumferential direction with the first edge interposed therebetween among edges of a road contact surface of the first block being an acute angle θa and an obtuse angle θb, two angles between an imaginary line obtained by extending a ridge line formed by the bend point of a groove wall on the second edge side of the second main groove and imaginary lines each obtained by extending two edges that are adjacent to each other in the tire circumferential direction with the second edge interposed therebetween among edges of a road contact surface of the second block being an acute angle θc and an obtuse angle θd, a difference between the acute angle θa and the obtuse angle θb being greater than a difference between the acute angle θc and the obtuse angle θd, and a difference of angles between groove walls on both sides of the first main groove with respect to the normal line of the tread surface in a meridian cross-section of the first main groove at positions of two points where intersection points of the imaginary lines obtained by extending each of the two edges that are adjacent to each other in the tire circumferential direction with the first edge interposed therebetween and a groove center line of the first main groove are moved along the groove center line by a predetermined distance in a direction approaching each other being greater than a difference of angles between groove walls on both sides of the second main groove with respect to the normal line of the tread surface in a meridian cross-section of the second main groove at positions of two points where intersection points of the imaginary lines obtained by extending each of the two edges that are adjacent to each other in the tire circumferential direction with the second edge interposed therebetween and a groove center line of the second main groove are moved along the groove center line by a predetermined distance in a direction approaching each other; wherein the lug grooves continuously extend from an outermost main groove to another outermost main groove in the tire width direction, the lug grooves extend inclined with respect to the tire width direction, the lug grooves extend across multiple land portions and an extension line of the lug grooves in one of the land portions smoothly connects with the extension line of the lug grooves in an adjacent land portion, the groove wall on the first edge side extends continuously from a side of the first block to another side of the first block in the tire circumferential direction without interruption by a lug groove and without interruption by a sipe, the groove wall on the second edge side extends continuously from a side of the second block to another side of the second block in the tire circumferential direction without interruption by a lug groove and without interruption by a sipe, both of edges of the first block in the tire width direction have a bent shape that projects to an inner side of the block in a plan view, and both of edges of the second block in the tire width direction have a bent shape that projects to an inner side of the block in a plan view the groove center line of the first main groove and the groove center line of the second main groove in a tread plan view each have a zigzag shape with an amplitude in the tire width direction, the zigzag shape of the groove center line of the first main groove is formed by repeating connections between a plurality of linear portions, the zigzag shape of the groove center line of the second main groove is formed by repeating connections between a long portion and a short portion having mutually different lengths in the tire circumferential direction, and the long portion of the zigzag shape of the groove center line of the second main groove overlaps, in the tire width direction, all other long portions of the second main groove along the tire circumferential direction, wherein all of the short portions intersect any one of the lug grooves and all of the long portions do not intersect any one of the lug grooves.

2. The tire according to claim 1, wherein angles of the groove walls on both sides of the first main groove with respect to the normal line of the tread surface are equal at a midpoint of a length between the two points along the groove center line of the first main groove; and angles of the groove walls on both sides of the second main groove with respect to the normal line of the tread surface are equal at a midpoint of a length between the two points along the groove center line of the second main groove.

3. The tire according to claim 2, wherein a ratio of a maximum distance between the groove walls of the second main groove at the two points along the groove center line of the second main groove to a maximum distance between the groove walls of the first main groove at the two points along the groove center line of the first main groove is 0.75 or more and 0.95 or less; and a ratio of a distance between the ridge lines at the two points along the groove center line of the second main groove to a distance between the ridge lines at the two points along the groove center line of the first main groove is 0.95 or more and 1.05 or less.

4. The tire according to claim 3, wherein a ratio of a length of the second block along the tire circumferential direction to a length of the first block along the tire circumferential direction is 0.75 or more and 0.95 or less.

5. The tire according to claim 4, a ratio of a length in the tire circumferential direction of the linear portions to a length in the tire circumferential direction of one pitch of the zigzag shape is 0.45 or more and 0.55 or less; and a ratio of a length in the tire circumferential direction of the long portion to a length in the tire circumferential direction of one pitch of the zigzag shape by the long portion and the short portion is 0.50 or more and 0.60 or less.

6. The tire according to claim 5, wherein in a tread plan view, a ratio of an amplitude in the tire width direction of a center line of a zigzag shape of an edge portion of a tread contact surface along the first main groove to a developed tread width is 0.005 or more and 0.020 or less; and in a tread plan view, a ratio of an amplitude in the tire width direction of a center line of a zigzag shape of an edge portion of a tread contact surface along the second main groove to the developed tread width is 0.005 or more and 0.020 or less.

7. The tire according to claim 6, wherein in a tread plan view, a ratio of an amplitude in the tire width direction of a center line of a zigzag shape of the ridge line along the first main groove to a developed tread width is 0.005 or more and 0.030 or less; and in a tread plan view, a ratio of an amplitude in the tire width direction of a center line of a zigzag shape of the ridge line along the second main groove to the developed tread width is 0.005 or more and 0.030 or less.

8. The tire according to claim 7, wherein a ratio of an area of a road contact surface of the second block to an area of a road contact surface of the first block is 0.87 or more and 0.97 or less.

9. The tire according to claim 8, wherein a first groove width of the lug grooves at a midpoint of a distance in the tire width direction between intersection points of two imaginary lines obtained by extending each of edges of the first block defined by the main grooves that are adjacent to each other in the tire width direction and a groove center line of the lug grooves is less than a second groove width of the lug grooves at a midpoint of a distance in the tire width direction between intersection points of two imaginary lines obtained by extending each of edges of the second blocks defined by the main grooves that are adjacent to each other in the tire width direction and a groove center line of the lug grooves; and the ratio of the second groove width to the first groove width is 1.05 or more and 1.50 or less.

10. The tire according to claim 9, further comprising:

a raised bottom portion that is provided in a region including the midpoint of the lug grooves and raises a groove bottom of the lug grooves to make a groove depth shallower than other portions;

a ratio of the groove depth of the lug grooves in the portion where the raised bottom portion is provided to the groove depths of the first main groove and the second main groove being 0.15 or more and 0.35 or less.

11. The tire according to claim 1, wherein a ratio of a maximum distance between the groove walls of the second main groove at the two points along the groove center line of the second main groove to a maximum distance between the groove walls of the first main groove at the two points along the groove center line of the first main groove is 0.75 or more and 0.95 or less; and a ratio of a distance between the ridge lines at the two points along the groove center line of the second main groove to a distance between the ridge lines at the two points along the groove center line of the first main groove is 0.95 or more and 1.05 or less.

12. The tire according to claim 1, wherein a ratio of a length of the second block along the tire circumferential direction to a length of the first block along the tire circumferential direction is 0.75 or more and 0.95 or less.

13. The tire according to claim 1, a ratio of a length in the tire circumferential direction of the linear portions to a length in the tire circumferential direction of one pitch of the zigzag shape is 0.45 or more and 0.55 or less; and a ratio of a length in the tire circumferential direction of the long portion to a length in the tire circumferential direction of one pitch of the zigzag shape by the long portion and the short portion is 0.50 or more and 0.60 or less.

14. The tire according to claim 1, wherein in a tread plan view, a ratio of an amplitude in the tire width direction of a center line of a zigzag shape of an edge portion of a tread contact surface along the first main groove to a developed tread width is 0.005 or more and 0.020 or less; and in a tread plan view, a ratio of an amplitude in the tire width direction of a center line of a zigzag shape of an edge portion of a tread contact surface along the second main groove to the developed tread width is 0.005 or more and 0.020 or less.

15. The tire according to claim 1, wherein in a tread plan view, a ratio of an amplitude in the tire width direction of a center line of a zigzag shape of the ridge line along the first main groove to a developed tread width is 0.005 or more and 0.030 or less; and in a tread plan view, a ratio of an amplitude in the tire width direction of a center line of a zigzag shape of the ridge line along the second main groove to the developed tread width is 0.005 or more and 0.030 or less.

16. The tire according to claim 1, wherein a ratio of an area of a road contact surface of the second block to an area of a road contact surface of the first block is 0.87 or more and 0.97 or less.

17. The tire according to claim 1, wherein a first groove width of the lug grooves at a midpoint of a distance in the tire width direction between intersection points of two imaginary lines obtained by extending each of edges of the first block defined by the main grooves that are adjacent to each other in the tire width direction and a groove center line of the lug grooves is less than a second groove width of the lug grooves at a midpoint of a distance in the tire width direction between intersection points of two imaginary lines obtained by extending each of edges of the second blocks defined by the main grooves that are adjacent to each other in the tire width direction and a groove center line of the lug grooves; and the ratio of the second groove width to the first groove width is 1.05 or more and 1.50 or less.

18. The tire according to claim 17, further comprising:

a raised bottom portion that is provided in a region including the midpoint of the lug grooves and raises a groove bottom of the lug grooves to make a groove depth shallower than other portions;

a ratio of the groove depth of the lug grooves in the portion where the raised bottom portion is provided to the groove depths of the first main groove and the second main groove being 0.15 or more and 0.35 or less.

19. The tire according to claim 1, further comprising:

chamfered portions respectively provided on both end portions in the tire circumferential direction of the first edge; and chamfered portions respectively provided on both end portions in the tire circumferential direction of the second edge.

20. The tire according to claim 1, wherein each of the plurality of blocks comprises at least one bent portion, and has a bent shape that projects to an inner side of the blocks in a plan view.

21. A tire, comprising: a plurality of main grooves extending in a tire circumferential direction; a land portion defined by the main grooves; a plurality of lug grooves extending through the land portion; and a plurality of blocks defined by the plurality of main grooves and the plurality of lug grooves, the main grooves comprising, in a meridian cross-section, a bend point where an angle of a groove wall with respect to a normal line of a tread surface changes, the bend point not including a transition from a groove bottom of the main grooves to the groove wall of the main grooves and the bend point being provided radially outward of the groove bottom of the main grooves, the plurality of blocks comprising a first block and a second block, where among a first main groove and a second main groove having distances differing from each other in a tire width direction from a tire equatorial plane, the first block has a first edge along the first main groove where a distance in the tire width direction is closer to the tire equatorial plane and the second block has a second edge along the second main groove where a distance in the tire width direction is farther from the tire equatorial plane, two angles between an imaginary line obtained by extending a ridge line formed by the bend point of a groove wall on the first edge side of the first main groove and imaginary lines each obtained by extending two edges that are adjacent to each other in the tire circumferential direction with the first edge interposed therebetween among edges of a road contact surface of the first block being an acute angle θa and an obtuse angle θb, two angles between an imaginary line obtained by extending a ridge line formed by the bend point of a groove wall on the second edge side of the second main groove and imaginary lines each obtained by extending two edges that are adjacent to each other in the tire circumferential direction with the second edge interposed therebetween among edges of a road contact surface of the second block being an acute angle θc and an obtuse angle θd, a difference between the acute angle θa and the obtuse angle θb being greater than a difference between the acute angle θc and the obtuse angle θd, and a difference of angles between groove walls on both sides of the first main groove with respect to the normal line of the tread surface in a meridian cross-section of the first main groove at positions of two points where intersection points of the imaginary lines obtained by extending each of the two edges that are adjacent to each other in the tire circumferential direction with the first edge interposed therebetween and a groove center line of the first main groove are moved along the groove center line by a predetermined distance in a direction approaching each other being greater than a difference of angles between groove walls on both sides of the second main groove with respect to the normal line of the tread surface in a meridian cross-section of the second main groove at positions of two points where intersection points of the imaginary lines obtained by extending each of the two edges that are adjacent to each other in the tire circumferential direction with the second edge interposed therebetween and a groove center line of the second main groove are moved along the groove center line by a predetermined distance in a direction approaching each other; wherein the difference of the angles between the groove walls on both sides of the first main groove with respect to the normal line of the tread surface in the meridian cross-section of the first main groove is 1 degree or more and 15 degrees or less, one of the groove walls of the first main groove inclining toward a first side in the tire width direction and another one of the groove walls of the first main groove inclining toward a second side in the tire width direction opposite the first side, the difference of the angles between the groove walls on both sides of the second main groove with respect to the normal line of the tread surface in the meridian cross-section of the second main groove is 1 degree or more and 15 degrees or less, one of the groove walls of the second main groove inclining toward the first side in the tire width direction and another one of the groove walls of the second main groove inclining toward the second side in the tire width direction opposite the first side, the first block is disposed on the tire equatorial plane, the second block is on a first side of the first block in the tire width direction and a third block having an identical shape to the second block is on a second, opposite side of the first block in the tire width direction, both of edges of the first block in the tire width direction have a bent shape that projects to an inner side of the block in a plan view, and both of edges of the second block in the tire width direction have a bent shape that projects to an inner side of the block in a plan view the groove center line of the first main groove and the groove center line of the second main groove in a tread plan view each have a zigzag shape with an amplitude in the tire width direction, the zigzag shape of the groove center line of the first main groove is formed by repeating connections between a plurality of linear portions, the zigzag shape of the groove center line of the second main groove is formed by repeating connections between a long portion and a short portion having mutually different lengths in the tire circumferential direction, and the long portion of the zigzag shape of the groove center line of the second main groove overlaps, in the tire width direction, all other long portions of the second main groove along the tire circumferential direction, wherein all of the short portions intersect any one of the lug grooves and all of the long portions do not intersect any one of the lug grooves.

* * * * *